(12) United States Patent
Duo' et al.

(10) Patent No.: US 12,715,359 B2
(45) **Date of Patent: *Aug. 25, 2026**

(54) SOUND AND PERFORMANCE EMULATOR FOR ELECTRIC VEHICLES

(71) Applicant: 2ELECTRON S.R.L., Venaria Reale (IT)

(72) Inventors: Jonathan Duo', Caselle Torinese (IT); Francesco Spagnolo, Venaria Reale (IT)

(73) Assignee: 2ELECTRON S.R.L., Venaria Reale (IT)

( * ) Notice: Subject to any disclaimer, the term of this patent is extended or adjusted under 35 U.S.C. 154(b) by 57 days.

This patent is subject to a terminal disclaimer.

(21) Appl. No.: 18/780,411

(22) Filed: Jul. 22, 2024

(65) Prior Publication Data

US 2025/0050807 A1 Feb. 13, 2025

Related U.S. Application Data

(63) Continuation of application No. 17/292,177, filed as application No. PCT/IB2019/059661 on Nov. 11, 2019, now Pat. No. 12,145,503.

(30) Foreign Application Priority Data

Nov. 9, 2018 (IT) ........................ 102018000010226

(51) Int. Cl.
*B60Q 5/00* (2006.01)
*B62J 3/10* (2020.01)
*H04R 1/02* (2006.01)

(52) U.S. Cl.
CPC ............... *B60Q 5/008* (2013.01); *H04R 1/02* (2013.01); *B62J 3/10* (2020.02); *H04R 2499/13* (2013.01)

(58) Field of Classification Search
None
See application file for complete search history.

(56) References Cited

U.S. PATENT DOCUMENTS 4,325,199 A * 4/1982 McEdwards ........... A63H 17/34 446/454
2008/0060861 A1 3/2008 Baur et al.
(Continued)

FOREIGN PATENT DOCUMENTS

| | | |
|---|---|---|
| CN | 206417114 U | 8/2017 |
| JP | 2009078576 A | 4/2009 |
| KR | 101689236 B1 | 12/2016 |

OTHER PUBLICATIONS

Maunder, Matthew et al., "System for Augmenting the In-Cabin Sound of Electric Vehicles," Jun. 5, 2017, SAE International, 2017-01-1757 (Year: 2017).*
(Continued)

*Primary Examiner* — Madison R. Inserra
(74) *Attorney, Agent, or Firm* — MH2 Technology Law Group LLP

(57) ABSTRACT

This invention concerns a sound and performance emulator (1) for an electric propulsion vehicle (100) with a first sensor (2) to emit a clutch signal (**2*a*) relative to the position of a clutch (101) of the electric propulsion vehicle (100); a second sensor (3) to emit a gear signal (3*a*) relative to the position of a gear-switch (102) of the electric propulsion vehicle (100); a control unit (4) which receives an acceleration signal (5) relating to an accelerator position (103) of the electric propulsion vehicle (100); a vehicle speed signal (6) and/or an engine revolutions signal (7) relating to the engine revolutions (RpmExt) of the electric motor (104); the clutch signal (2*a*); and the gear signal (3*a*). The control unit (4**) calculates a simulated engine revolutions value (RpmFinal) and a simulated gear inserted value (GearInserted) of a (Continued)

simulated endothermic combustion vehicle. The control unit (4) provides a requested simulated torque value and/or an output throttle signal (OutputThrottle) to be sent to the electric propulsion vehicle (100) to control it.

18 Claims, 12 Drawing Sheets

(56) References Cited

U.S. PATENT DOCUMENTS

2010/0166210 A1 7/2010 Isozaki
2011/0085674 A1* 4/2011 Fujikawa .............. G10K 15/02
381/86
2012/0083958 A1 4/2012 Ballard
2012/0312609 A1 12/2012 Takewaka et al.
2013/0177167 A1 7/2013 Takahashi et al.
2014/0195088 A1 7/2014 Schuessler
2014/0375443 A1 12/2014 Aoyagi et al.
2015/0199955 A1 7/2015 Draganic
2016/0016091 A1 1/2016 Allmendinger et al.
2018/0090125 A1 3/2018 Yeung
2021/0094468 A1 4/2021 Tanaka

OTHER PUBLICATIONS

Search Report dated Feb. 5, 2020 in corresponding International Application No. PCT/IB2019/059661, 4 pages.
Written Opinion dated Feb. 5, 2020 in corresponding International Application No. PCT/IB2019/059661, 7 pages.
European Notice of Opposition dated Apr. 14, 2026 in counterpart European Application No. 19813131.0, 32 pages.

* cited by examiner

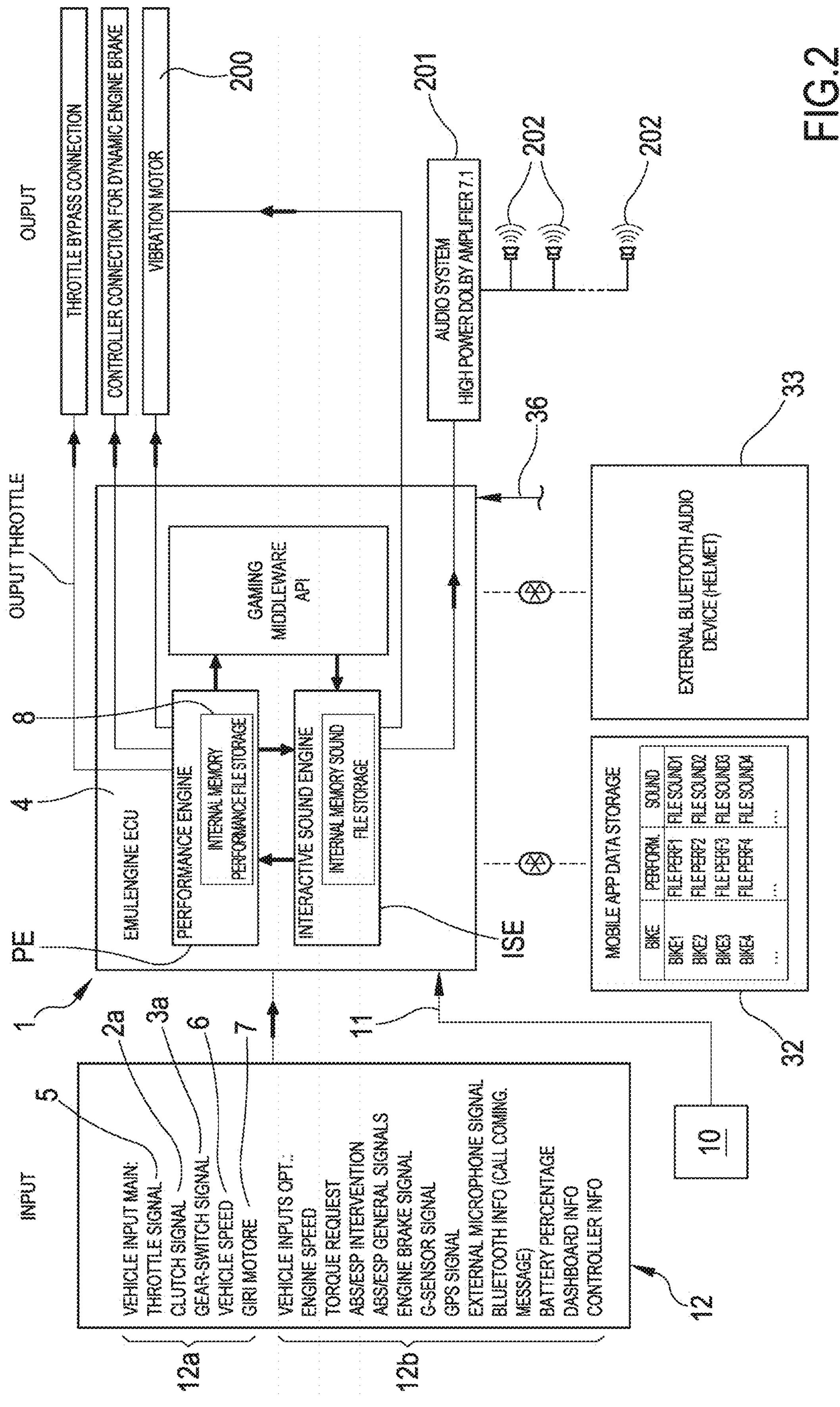
INPUT
VEHICLE INPUT MAIN:
THROTTLE SIGNAL
CLUTCH SIGNAL
GEAR-SWITCH SIGNAL
VEHICLE SPEED
GIRI MOTORE
VEHICLE INPUTS OPT.:
ENGINE SPEED
TORQUE REQUEST
ABS/ESP INTERVENTION
ABS/ESP GENERAL SIGNALS
ENGINE BRAKE SIGNAL
G-SENSOR SIGNAL
GPS SIGNAL
EXTERNAL MICROPHONE SIGNAL
BLUETOOTH INFO (CALL COMING, MESSAGE)
BATTERY PERCENTAGE
DASHBOARD INFO
CONTROLLER INFO
12a
12b
12
5
2a
3a
6
7
1
11
10
PE
4
8
EMULENGINE ECU
PERFORMANCE ENGINE
INTERNAL MEMORY PERFORMANCE FILE STORAGE
INTERACTIVE SOUND ENGINE
INTERNAL MEMORY SOUND FILE STORAGE
GAMING MIDDLEWARE API
ISE
OUPUT THROTTLE
OUPUT
THROTTLE BYPASS CONNECTION
CONTROLLER CONNECTION FOR DYNAMIC ENGINE BRAKE
VIBRATION MOTOR
200
201
AUDIO SYSTEM
HIGH POWER DOLBY AMPLIFIER 7.1
202
202
36
MOBILE APP DATA STORAGE
BIKE
PERFORM.
SOUND
BIKE1
BIKE2
BIKE3
BIKE4
FILE PERF1
FILE PERF2
FILE PERF3
FILE PERF4
FILE SOUND1
FILE SOUND2
FILE SOUND3
FILE SOUND4
32
EXTERNAL BLUETOOTH AUDIO DEVICE (HELMET)
33
FIG.2

SOUND AND PERFORMANCE EMULATOR FOR ELECTRIC VEHICLES

FIELD OF THE INVENTION

This invention concerns a sound and performance emulator for electric propulsion vehicles. In more detail, the emulator object of the invention is configured to fully emulate the performance, driveability and sound of any vehicle with combustion engine on a vehicle of the same segment with electric motorization. The emulator simulates the functionality of the mechanical/sequential gearbox, by means of analog sensors used as gear lever and clutch with potentiometer.

An electric vehicle equipped with the mentioned emulator is also the subject of the invention.

STATE OF THE ART

In recent years, electric vehicles have become increasingly popular, including electric motorcycles and electric cars, i.e. vehicles with electric motors that use as their primary energy source the chemical energy stored in one or more rechargeable batteries and made available to the motor in the form of electrical energy.

The spread of this type of technology is linked to the well-known problems of environmental pollution that it intends to solve by eliminating the emission of pollutants (including fine dust, NOx, but also $CO_2$). Electric vehicles have a higher overall energy efficiency than internal combustion engines; as disadvantages there is a limited autonomy between recharging, a high time taken for recharging and low battery life, although with the advance of research new types of rechargeable batteries and new technologies have increased the range and service life, while reducing the recharging time.

One of the 'minor' drawbacks, but certainly not negligible, is the substantial absence of noise that is present in vehicles with endothermic engine instead. In fact, the electric motor is basically extremely quiet. This characteristic, which could be seen as a value (for example for the user), often turns into a risk for the safety of pedestrians and cyclists, as the total absence of noise from the engine makes these cars difficult to perceive when they are in motion, if not when it is too late to avoid them. Researches show that electric cars are actually dangerous: an electric car is 40% more likely to hit a pedestrian than a conventional vehicle. The problem is amplified with blind or visually impaired people: 93% of this category said they had problems recognizing the non-sound emitted by electric cars. From 2019, all electric cars sold in Europe will have to emit a certain "noise" below 20 km/h. A specific regulation requires the emission of a standard frequency capable of reproducing a sound that makes immediate—for road users—the recognition of an incoming electric vehicle, especially in urban areas where the noise of tire rolling is insufficient.

For these purposes, many companies have taken preventive action to solve the specific problem. Honda Motors' U.S. Pat. No. 5,635,903A describes a simulated sound generator to be used in an electric vehicle, which generates artificial sounds similar to those generated by petrol-powered cars at startup, operation, acceleration and deceleration, also taking into account environmental noise. Patent application US2012312609A1 refers to a device that generates a simulation sound audible to the driver or pedestrian for notification of approach of an electrically powered motorcycle. In particular, the document mentions that a sound similar to that of an internal combustion engine can be emitted so that a pedestrian can easily recognize the arrival of the motorcycle. As described there, a Helmholtz resonator as a noise emitting device is located inside the front cover and on the front side of the motorcycle bodywork. US2010166210A1 describes an advanced system in which there is a device for calculating the equivalent speed of the endothermic engine and a device for generating the sound of the endothermic engine to generate the sound of the engine simulated in the driving conditions of the electric motor vehicles with four wheels and two wheels. The devices according to this patent are able to generate an artificial sound of the engine close to that actually produced by an endothermic motor vehicle even when the calculated speed does not vary in proportion to the driving speed of the electric or hybrid vehicle. The endothermic engine sound generating device has an engine speed sensor, vehicle speed sensor, throttle aperture sensor, engine speed calculator, engine sound generating unit, vehicle independent engine speed memory, vehicle dependent engine speed memory, and engine sound memory. The motor rotation speed sensor detects the rotation speed of a motor. The vehicle's speed sensor detects the speed of rotation of the vehicle's wheels, while the accelerator opening sensor detects the pressure on an accelerator pedal, for example the throttle opening in intervals, where a higher value represents a deeper lowering of the accelerator pedal. All data goes to the calculation unit; the sensor opening information is also provided to the engine sound generation unit. The calculation unit takes data from the engine speed memory based on information on engine speed, vehicle speed and acceleration opening information, thereby acquiring a virtual engine speed. The virtual engine speed is sent to the engine sound generation unit. Where the unit estimates that the virtual engine speed is not considered proportional to the vehicle speed, e.g. when starting a vehicle or in the semi-grafting of a clutch (which is likely to occur in a motor vehicle), it recovers a desired value of the virtual engine speed from the vehicle-independent engine speed memory, which stores various virtual engine speed values depending on the opening of the throttle, but not on the vehicle speed. When the unit estimates that the virtual engine speed is considered proportional to the vehicle speed, it recovers another value of the virtual engine speed, which depends both on the opening of the throttle and on the speed of the vehicle, from the memory of the engine speed dependent on the vehicle. Based on the virtual engine speed and information on the throttle opening, the sound generating unit takes the sounds of the endothermic engine from the memory so as to generate the engine sound via an external loudspeaker. Document KR101689236B1 concerns a method for emitting virtual combustion engine sounds and vibrations. The same allows the user to check if an engine is successfully started and to experience the sounds of an endothermic engine, as well as the sounds of the exhaust of a car or other vehicle in a vehicle that uses electricity for propulsion; in addition, the system described improves the feeling of driving by providing corresponding virtual vibrations. Finally, US2018090125A1 concerns an improved system for noise emission in electric vehicles. The sound experience system can be configured to simulate a vehicle with fuel and automatic or manual transmission. The system can simulate the use of a clutch pedal and/or gear lever in the sound. For example, the driver may perceive the clutch engagement delay (even if there is no clutch pedal). The system can include a database with traditional driving experience simulation data for a range of vehicles. In one of them can be simulated different general types of vehicles, such as compact vehicles, medium, sedans, sports cars, SUVs, trucks, industrial vehicles, garbage trucks, tractors, go-karts, motorcycles, or any other vehicle. The different types can also include different types of engines, such as 4-cylinder, boxer, V-6, V8, V-10, rotary, diesel, propane, natural gas, turbocharged, supercharged, nitro, motorcycle engines, 4-stroke, 2-stroke, V-twins, combinations of these. In other words, the electric vehicle can offer the traditional sound experience of any type of vehicle, even if it is different from the driven electric vehicle.

SUMMARY OF THE INVENTION

From what has been described above, it is clear that the sound simulation has gone beyond the mere legal requirements for safety, but there is still room for major improvements in emulation that can bring the driver of an electric vehicle the complete feeling of being at the wheel of a more common endothermic motor vehicle.

One purpose of this invention is to provide a complete emulation system that allows to feel a real driving experience of an endothermic-powered vehicle while driving an electric vehicle.

One of the aims is to be able to faithfully emulate the torque and/or power curves of the endothermic engine, as well as to be able to emulate the gear ratios and the final ratio with calibration and adaptation according to the used vehicle.

One aim is also to provide a sound and performance emulator that is easy to install on the electric vehicle and does not require special modifications to the vehicle itself, so as to be able to retrofit electric vehicles already on the market with changes that can be implemented substantially by any specialized workshop.

An optional objective of the invention is to simulate performance by taking into account the weight and aerodynamic coefficient of the used vehicle and of the vehicle to be emulated.

An auxiliary purpose is also to be able to control the regenerative braking of the electric motor to simulate the motor brake of the endothermic motor.

The proposed emulation optionally includes an emulation of endothermic engine vibrations, and the sound emulation takes into account typical endothermic engine situations such as scratching, clutchless changing, launch control, etc.

These and other purposes will better appear from the following detailed description of an illustrative and therefore not limiting embodiment of the invention.

ASPECTS OF THE INVENTION

Aspects of the invention are as follows.

A 1st aspect refers to a sound and performance emulator (1) for an electric propulsion vehicle (100) comprising:

- a control unit (4) configured to receive a plurality of input signals (12) comprising at least:
  - an acceleration signal (5) relating to a position of an accelerator (103) of the electric propulsion vehicle (100);
  - a vehicle speed signal (6) relating to the speed of the electric propulsion vehicle (100) to determine a value relating to the engine revolutions (RpmExt) of an electric propulsion vehicle (104) and/or an engine revolutions signal (7) relating to the engine revolutions (RpmExt) of the electric motor (104) of the electric propulsion vehicle (100);
- where the control unit (4) is configured to determine a plurality of output values comprising at least one and optionally both:
  - a value of simulated engine revolution (RpmFinal) of a simulated endothermic combustion vehicle;
  - a simulated gear inserted value (GearInserted) of the simulated endothermic combustion vehicle; and
- where the control unit (4) is configured to provide a plurality of output values comprising at least:
  - a simulated torque value requested and/or simulated power requested (18)
  - an accelerator control signal (OutputThrottle) to be sent to the electric propulsion vehicle (100) to control it.

In a 2nd aspect according to the first aspect, wherein the control unit (4) is further configured to:

- receive an activation signal (11);
- after receiving the activation signal (11), set the simulated engine revolutions value (RpmFinal) to a default value other than zero, e.g. function of the simulated endothermic combustion vehicle, and to activate and execute an emulation module that includes a performance simulation routine of the simulated endothermic combustion vehicle and a sound simulation routine of the simulated endothermic combustion vehicle;
- optionally after receiving the activation signal (11) and setting of the simulated engine revolutions value (RpmFinal) to the default value, the sound simulation routine emitting a sampled start sound.

In a 3rd aspect according to any of the previous aspects the control unit is configured for:

- determine the simulated gear inserted value (GearInserted) of the simulated endothermic combustion vehicle;
- calculate, by means of the emulation module, a value of simulated engine revolutions (RpmFinal) at the current time (t) depending at least on the acceleration signal (5), the number of engine revolutions (RpmExt) of the electric motor (104) and the value of the simulated gear inserted (GearInserted);
- calculate, by means of the emulation module, the requested simulated torque value (TorqueFinal) and/or the required simulated power value as a function of the simulated engine revolutions value (RpmFinal) and of the acceleration signal (5).

In a 4th aspect according to any of the previous aspects, the control unit, alternatively, providing in output the value of requested simulated torque and/or requested simulated power (18) calculated to command a control unit (105) of the electric propulsion vehicle (100) to deliver such torque or power, or determining an accelerator control signal (OutputThrottle) depending on the requested simulated torque value (TorqueFinal) and/or requested simulated power (18) calculated and of the value relative to the engine revolutions of the electric motor (104), the accelerator control signal (OutputThrottle) being sent to the electric propulsion vehicle (100) to control it.

In a 5th aspect according to any of the previous aspects, the emulator includes a first sensor (2) configured to emit a clutch signal (2*a*) relative to the position of a clutch (101) of the electric propulsion vehicle (100).

In a 6th aspect according to any of the previous aspects, the emulator includes a second sensor (3) configured to emit a gear signal (3*a*) relative to the position of a gear shift selector (102) of the electric propulsion vehicle (100).

In a 7th aspect according to any of the previous aspects, the control unit (4) configured to receive the clutch signal (2*a*).

In an 8th aspect according to any of the previous aspects, the control unit (4) configured to receive the gear signal (3*a*).

In a 9th aspect according to any of the previous aspects, the emulator (1) also includes a user interface (9) operationally connected to the control unit (4) to exchange data with the control unit (4), the user interface (9) including at least one start button (10), the control unit (4) being configured to determine the activation of the start button receiving said activation signal (11) and activating the emulation module, if deactivated, or deactivating the emulation module, if active.

In a 10th aspect according to any of the previous aspects, the user interface includes a display, the control unit (4) being configured to represent on the display one or more of:

- an analogue and/or digital tachometer representing the simulated engine revolutions value (RpmFinal);
- a speed of the electric propulsion vehicle (100);
- the value of the simulated inserted gear (GearInserted) of the simulated endothermic combustion vehicle;
- a simulated endothermic combustion vehicle identifier;
- one or more technical configurations of the simulated endothermic combustion vehicle.

In an 11th aspect according to any of the previous aspects, the user interface includes a touch screen display, the control unit (4) being configured to represent on the display said start button (10), in particular the start button (10) changing configuration in case the emulation module is activated or deactivated.

In a 12th aspect according to any of the previous aspects, the user interface (9) includes a display and a number of physical keys (107), the physical keys being in particular configured to be positioned on a handlebar (106) of the electric propulsion vehicle (100), the physical keys (107) being connected to the control unit (4) to send the respective signals after activation and including at least a prefixed number of navigation keys to navigate between display representations and select one and a confirmation key to confirm a selection, optionally the physical keys also including a return key to deselect a previous selection and return to a previous menu.

In a 13th aspect according to any of the previous aspects, the control unit (4) is configured to receive and/or react to receiving the activation signal conditional on the activation of the electric propulsion vehicle (100), for example an activation by key or transponder or similar electric propulsion vehicle start authorization system (100), optionally, in addition to or alternatively, the control unit (4) being configured to receive and/or react to receiving the activation signal conditional on the activation of an additional physical safety key (108).

In a 14th aspect according to any of the previous aspects, the emulator also includes a memory (8) operationally connected to the control unit (4) and including at least a selection list of a plurality of endothermic combustion vehicles to be simulated, the control unit (4) presenting a vehicle selection module to allow a user to select one of the vehicles from the list, each vehicle in the list being associated with a corresponding data package specific to the vehicle and including performance, calibration and sound data, optionally also vibration data.

In a 15th aspect according to any of the previous aspects, following the selection of a vehicle from the list, the control unit (4) is configured to present a list of technical options directly associated with the selected vehicle, the selection module allowing the user to select one or more of the technical options associated with the selected vehicle, the corresponding data package specific to the vehicle being a function of both the selected vehicle and each selected technical option.

In a 16th aspect according to any of the previous aspects, the control unit (4) is configured to calculate iteratively a value of simulated engine revolutions in neutral (RpmN(t)) at the current time (t) depending at least on the acceleration signal (5) and the value of simulated engine revolutions in neutral (RpmN(t−1)) at the preceding time (t−1), for example a difference between the current time (t) and the preceding time (t−1) being pre-defined in advance.

In a 17th aspect according to any of the previous aspects, the step of the control unit (4) to calculate iteratively the value of simulated engine revolutions at the current time (t) is a step to determine, depending on the acceleration signal (5) and the value of simulated engine revolutions in neutral (RpmN(t−1)) at the preceding time (t−1), a positive or negative number of simulated engine revolutions to be added to the value of simulated engine revolutions in neutral (RpmN(t−1)) at the preceding time (t−1).

In an 18th aspect according to any of the previous aspects, the emulator also includes a memory (8) operationally connected to the control unit (4) and including at least a calibration map in which, following a function input of the accelerator signal and a function input of the number of simulated engine revolutions in neutral (RpmN(t−1)) at the preceding time (t−1) is uniquely associated to a number of simulated revolutions, the control unit (4) accessing the memory (8) and the calibration map each predetermined time interval (Δt) to receive the simulated number of revolutions in neutral (RpmN(t−1)) at the preceding time (t−1) and calculate the value of simulated engine revolutions in neutral (RpmN(t)) at the current time (t).

In a 19th aspect of any of the above, the calibration map includes discrete input values for the throttle signal and discrete input values for the number of simulated engine revolutions in neutral (RpmN(t−1)) at the preceding time (t−1).

In a 20th aspect according to any of the previous aspects, the emulator also includes a first sensor (2) configured to emit a clutch signal (2*a*) relative to the position of a clutch (101) of the electric propulsion vehicle (100), the control unit (4) being configured to receive further the clutch signal (2*a*).

In a 21st aspect according to any of the previous aspects, the first sensor (2) is a potentiometer and the clutch signal (2*a*) is an analog signal, such as a voltage signal, a function of the clutch stroke (101), the control unit (4) being configured to convert the analog signal into a clutch signal in percentage by means of a conversion curve, optionally calibratable.

In a 22nd aspect according to any of the above aspects, the calibratable curve includes:

- a first initial section up to a prefixed value of the analog signal, in which the percentage value does not vary with the variation of the analog signal,
- a final stretch beyond an analog signal limit value, where the percentage value does not vary with the analog signal, and
- an intermediate section between the prefixed value and the limit value of the analog signal, in which the percentage value varies between 0 and 100%, in particular the variation of the percentage value being a linear variation in the interval of the intermediate section.

In a 23rd aspect according to any of the previous aspects, at least one, and in particular at least two of the following parameters are calibratable, or predefinable:

the predetermined value of the analogue signal;

the limit value of the analogue signal;

a slope of the intermediate section of the calibratable curve.

In a 24th aspect according to any of the previous aspects, the clutch signal (2*a*) varies between a released clutch signal, for example of a percentage value equal to 0%, and a fully activated clutch value, for example of a value equal to 100%.

In a 25th aspect according to any of the previous aspects, the emulator also includes a second sensor (3) configured to emit a gear signal (3*a*) relative to the position of a gear shift selector (102) of the electric propulsion vehicle (100), the control unit (4) being configured to further receive the gear signal (3*a*).

In a 26th aspect according to any of the previous aspects, the gear signal (3*a*) includes an upper position signal and a lower position signal, the control unit being configured to determine the simulated gear inserted value (GearInserted) of the simulated endothermic combustion vehicle, between a minimum value equal to zero and a maximum configurable value, for example equal to six, by increasing or decreasing by one unit the value of a simulated gear inserted (GearInserted) according to receiving the upper position signal or the lower position signal, for example the control unit (4) receiving the upper position signal thereby increasing the value of simulated gear inserted (GearInserted) by one unit and receiving the lower position signal thereby decreasing the value of simulated gear inserted (GearInserted) by one unit.

In a 27th aspect according to any of the previous aspects, if the value of simulated gear inserted (GearInserted) is equal to one, the control unit (4) is configured to determine if the gear signal (3*a*) is representative of an intermediate position, within a set interval, between an intermediate rest position between a position of maximum upper travel and a position of maximum lower travel, and one between the position of maximum upper travel and the position of maximum lower travel, if the gear signal (3*a*) is representative of the intermediate position for more than a preset time, the simulated gear inserted value (GearInserted) returns to zero, i.e. to simulated gear not inserted.

In a 28th aspect according to any of the previous aspects, wherein the second sensor (3) is a potentiometer and the gear signal (3*a*) is an analog signal, such as a voltage signal, function of the stroke of the gear shift selector (102), the control unit (4) being configured to convert the analog signal into a gear change signal in percentage by means of an optionally calibratable conversion curve.

In a 29th aspect according to any of the previous aspects, the gear shift selector (102) assumes an intermediate rest position between an upper maximum travel position and a lower maximum travel position, the gear signal in percentage in the rest position of the gear shift selector (102) assuming a value of about 50%, the gear signal in percentage in the position of maximum upper travel and in the position of maximum lower travel assuming respectively one of the values 0% and 100%, for example a value of the gear signal in percentage between 0% and 20% resulting in a unitary decrease in the value of simulated gear inserted (GearInserted) and a value between 80% and 100% resulting in a unitary increase in the value of gear inserted simulated (GearInserted), or vice versa.

In a 30th aspect according to any of the previous aspects, the control unit (4) is configured to calculate, by means of the emulation module, the value of simulated engine revolutions (RpmFinal) at the current time (t) depending at least on the acceleration signal (5), the number of revolutions of the electric motor (104), the value of simulated gear input (GearInserted) and the value of simulated engine revolutions (RpmFinal) at the preceding time (t−1).

In a 31st aspect according to any of the previous aspects, the control unit (4) is configured to calculate, by means of the emulation module, the value of simulated engine revolutions (RpmFinal) at the current time (t) as a function of at least the acceleration signal (5), the number of revolutions of the electric motor (104), the value of the simulated gear inserted (GearInserted), the value of the simulated engine revolutions (RpmFinal) at the preceding time (t−1) and the clutch signal (2*a*), in particular the clutch signal in percentage (ClutchPercentage).

In a 32nd aspect according to any of the previous aspects, the step of calculating the value of simulated engine revolutions (RpmFinal) at the current time (t) includes a sub-step of calculating the value of the number of simulated revolutions relative to the simulated gear inserted (RpmGearOut) as a function of the number of revolutions (RpmExt) of the electric motor (104) and the value of the simulated gear inserted (GearInserted), in particular, the value of the number of simulated revolutions relative to the simulated gear inserted (RpmGearOut) being calculated by multiplying the number of revolutions (RpmExt) of the electric motor (104) by a gear coefficient (RpmGear1Norm_c; RpmGear2Norm_c; RpmGear3Norm_c; . . . RpmGearNorm_c) function of the simulated gear inserted value.

In a 33rd aspect according to any of the previous aspects, the step of calculating the value of simulated engine revolutions (RpmFinal) at the current time (t) includes a sub-step of calculating the value of the number of simulated revolutions relative to the simulated gear inserted (RpmGearOut) as a function of the number of revolutions (RpmExt) of the electric motor (104) and the value of the simulated gear inserted (GearInserted), as well as the value of simulated engine revolutions in neutral (RpmN(t)), in particular the value of the simulated number of revolutions relative to the simulated gear inserted (RpmGearOut) being calculated by multiplying the number of revolutions (RpmExt) of the electric motor (104) by a gear coefficient (RpmGear1Norm_c; RpmGear2Norm_c; RpmGear3Norm_c; . . . RpmGearNorm_c) function of the simulated gear inserted value.

In a 34th aspect according to any of the previous aspects, the step of calculating the value of simulated engine revolutions (RpmFinal) at the current time (t) includes a further sub-step of determining the value of simulated engine revolutions (RpmFinal) at the current time (t) as a function of the value of the number of simulated revolutions relative to the simulated gear inserted (RpmGearOut) and of the clutch signal (2*a*), in particular the clutch signal in percentage (ClutchPercentage).

In a 35th aspect according to any of the previous aspects, the step of calculating the value of simulated engine revolutions (RpmFinal) at the current time (t) includes an additional sub-step of determining the value of simulated engine revolutions (RpmFinal) at the current time (t) as a function of the value of the simulated number of revolutions relative to the simulated gear inserted (RpmGearOut), the value of simulated engine revolutions in neutral (RpmN(t)), and the clutch signal (2*a*), in particular the clutch signal in percentage (ClutchPercentage).

In a 36th aspect according to any of the previous aspects, the value of simulated engine revolutions (RpmFinal) at the current time (t) is calculated by interpolating, preferably linearly, the value of the simulated number of revolutions relative to the simulated gear inserted (RpmGearOut) and the value of simulated engine revolutions in neutral (RpmN (t)) as a function of the clutch signal (2*a*), in particular with the released clutch signal, the value of simulated engine revolutions (RpmFinal) at the current time (t) is equal to the value of the simulated number of revolutions relative to the simulated gear inserted (RpmGearOut); with the clutch fully activated signal, the value of simulated engine revolutions (RpmFinal) at the current time (t) is equal to the value of simulated engine revolutions in neutral (RpmN(t)); in more detail, with a clutch signal (2*a*) at 50%, the value of simulated engine revolutions (RpmFinal) at the current time (t) is equal to half of the sum of the value of the simulated number of revolutions relative to the simulated gear inserted (RpmGearOut) and the value of simulated engine revolutions in neutral (RpmN(t)).

In a 37th aspect according to any of the previous aspects, the control unit (4) is configured to calculate iteratively the value of simulated engine revolutions (RpmFinal) at the current time (t) depending at least on the acceleration signal (5) and the value of simulated engine revolutions (RpmFinal) at the preceding time (t−1), for example a difference between the current time (t) and the preceding time (t−1) being pre-defined in advance.

In a 38th aspect according to any of the previous aspects, the step of the control unit (4) to calculate iteratively the value of the simulated engine revolutions at the current time (t) is a step to determine, according to the acceleration signal (5) and the value of the simulated engine revolutions (RpmFinal) at the preceding time (t−1), a number of variation, positive or negative, of the simulated engine revolutions to be added to the value of the simulated engine revolutions (RpmFinal) at the preceding time (t−1).

In a 39th aspect according to any of the previous aspects, the emulator also includes a memory (8) operationally connected to the control unit (4) and including at least a calibration map in which, following an input function of the accelerator signal and a function of the number of simulated engine revolutions (RpmFinal) at the preceding time (t−1) is uniquely associated a number of variation of simulated revolutions, the control unit (4) accessing the memory (8) and the calibration map each predetermined time interval (Δt) to receive the number of variation of simulated revolutions (RpmFinal) at the preceding time (t−1) and calculate the value of simulated engine revolutions (RpmFinal) at the current time (t).

In a 400 aspect according to any of the previous aspects, the calibration map includes discrete input values for the throttle signal and discrete input values for the number of simulated engine revolutions (RpmFinal) at the preceding time (t−1).

In a 41st aspect according to any of the previous aspects, the gear inserted value determined at r the activation signal equal to zero corresponding to the idle, i.e. the simulated gear not inserted.

In a 42nd aspect according to any of the previous aspects, the emulator also includes a memory (8) operationally connected to the control unit (4) and including at least a simulated torque map (14) and/or a simulated power map in which, following an input function of the acceleration signal (5) and function of the simulated engine revolutions (RpmFinal), a torque value relative to the simulated gear inserted (TorqueGearOut) and/or power relative to the simulated gear inserted is uniquely associated, the control unit (4) accessing the memory (8) and the simulated torque map (14) and/or the simulated power map to receive the torque value for the simulated gear inserted (TorqueGearOut) and/or the power value for the simulated gear inserted.

In a 43rd aspect according to any of the previous aspects, the emulator also includes a memory (8) operationally connected to the control unit (4) and including at least a simulated torque map (14) and/or a simulated power map for each simulated gear, wherein an input function of the acceleration signal (5) and an input function of the simulated engine revolutions (RpmFinal), a torque value relative to the simulated gear inserted (TorqueGearOut) and/or power value relative to the simulated gear inserted is uniquely associated, the control unit (4) accessing memory (8) and selecting the simulated torque map (14) and/or the simulated power map according to the simulated gear value (GearInserted) to receive the torque value relative to the simulated gear value (TorqueGearOut) and/or the power value relative to the simulated gear inserted value (TorqueGearOut).

In a 44th aspect according to any of the previous aspects, if the simulated gear inserted value is equal to zero, i.e. neutral gear, the torque value relative to the simulated gear inserted (TorqueGearOut) is equal to zero.

In a 45th aspect according to any of the previous aspects, the control unit (4) is configured to correct the torque value relative to the simulated gear inserted (TorqueGearOut) depending on at least one of, and in particular both, an aerodynamic drag parameter of the simulated endothermic combustion vehicle and a weight parameter of the simulated endothermic combustion vehicle, the control unit (4) being configured to calculate the pre-final torque request value (TorquePreFinal) of the simulated endothermic combustion vehicle following the correction.

In a 46th aspect according to any of the previous aspects, the control unit (4) is configured to calculate an aerodynamic correction value (TorqueCXcorrection) for the torque value relative to the simulated gear inserted (TorqueGearOut), the aerodynamic correction value (TorqueCXcorrection) being a function of the speed of the electric propulsion vehicle (100) and of at least one coefficient that takes into account the different aerodynamic coefficients of the electric propulsion vehicle (100) and the simulated endothermic combustion vehicle, in particular the control unit (4) being configured to calculate the pre-final torque request value (TorquePreFinal) of the simulated endothermic combustion vehicle by adding the torque value relative to the simulated gear inserted (TorqueGearOut) to the aerodynamic correction value (TorqueCXcorrection) and/or to the weight correction value (TorqueWeightCorrection).

In a 47th aspect according to any of the previous aspects, the control unit (4) is configured to calculate a weight correction value (TorqueWeightCorrection) for the torque value relative to the simulated gear inserted (TorqueGearOut), the weight correction value (TorqueWeightCorrection) being a function of the value of the simulated number of revolutions relative to the simulated gear inserted (RpmGearOut) and of at least one coefficient taking into account the different weights of the electric propulsion vehicle (100) and the simulated endothermic combustion vehicle, in particular the control unit (4) being configured to calculate the pre-final torque request value (TorquePreFinal) of the simulated endothermic combustion vehicle by adding the torque value relative to the simulated gear inserted (TorqueGearOut) to the weight correction value (TorqueWeightCorrection) and/or to the aerodynamic correction value (TorqueCXcorrection).

In a 48th aspect according to any of the previous aspects, the control unit (4) is configured to calculate the requested simulated torque value (TorqueFinal) as a function of:

the pre-final torque request value (TorquePreFinal) of the simulated endothermic combustion vehicle or of the torque value relative to the simulated gear inserted (TorqueGearOut) of the simulated endothermic combustion vehicle; and the clutch signal (2*a*), in particular the clutch signal in percentage (ClutchPercentage).

In a 49th aspect according to any of the previous aspects, the requested simulated torque value (TorqueFinal) is calculated by interpolating, preferably linearly, between a zero value and the pre-final torque request value (TorquePreFinal) or the torque value relative to the simulated gear inserted (TorqueGearOut) as a function of the clutch signal (2*a*), in particular with the released clutch signal, the requested simulated torque value (TorqueFinal) coinciding with the pre-final torque request value (TorquePreFinal) or the torque value relative to the simulated gear inserted (TorqueGearOut), with the fully activated clutch signal, the requested simulated torque value (TorqueFinal) being equal to zero.

In a 50th aspect according to any of the previous aspects, the emulator also includes a memory (8) operationally connected to the control unit (4) and including at least a real torque map (14) in which, following an input function of the value relative to engine revolutions (RpmExt) of the electric motor (104) and the requested simulated torque value (TorqueFinal) an accelerator control value (AccPercentageOut) is associated, the control unit (4) accessing the memory (8) and selecting the real torque map (14) to receive the acceleration command value (AccPercentageOut) and determine the accelerator control signal (OutputThrottle) to be sent to the electric propulsion vehicle control unit (100) to control it.

In a 51st aspect according to any of the previous aspects, the control unit (4) is configured to receive the acceleration command value (AccPercentageOut) as a percentage value and transform it into the analog accelerator control signal (OutputThrottle) to be sent to the electric propulsion vehicle (100) control unit.

In a 52nd aspect according to any of the previous aspects, the control unit (4) receives a real torque signal from the electric propulsion vehicle (100) and self-fills the real torque map (14) with the values received from the control unit (105).

In a 53rd aspect according to any of the previous aspects, for values below engine speed of the simulated engine revolutions (RpmFinal), for example for values below 1000 rpm, in particular below 1500 rpm, the simulated torque map (14) includes values that increase and decrease in succession to create a non-linear delivery effect of the below engine speed condition.

In a 54th aspect according to any of the previous aspects, the emulator also includes a memory (8) operationally connected to the control unit (4) and including at least a map of brake parameters/engine inertia of the simulated endothermic combustion vehicle associated with a respective variation, positive or negative, of the simulated engine revolutions value (RpmFinal), and wherein the control unit (4) is configured to calculate the variation (DownShiftAccelerationValue) of the simulated engine revolutions value (RpmFinal) and obtain a brake torque value/engine start value (DownShiftEngineBrake), the control unit (4) adding the brake/engine start torque value (DownShiftEngineBrake) to the requested simulated torque value (TorqueFinal) to correct the requested simulated torque value to obtain a motor brake or motor inertia effect, in particular wherein the variation (DownShiftAccelerationValue) of the simulated engine revolutions value (RpmFinal) is calculated only when the requested simulated torque value (TorqueFinal) is below zero.

In a 55th aspect, according to any of the previous aspects, a corrected requested simulated torque value (TorqueFinal) below zero controls the control unit (105) to obtain a regenerative braking, in particular the corrected requested simulated torque value (TorqueFinal) below −100 is cut and brought back to −100, the regenerative braking value to −100 corresponding to a wheel lock.

In a 56th aspect according to any of the above aspects, the control unit (4) is configured to compare the simulated engine revolutions value (RpmFinal) with an engine idle value (RpmNldle) of the simulated endothermic combustion vehicle, if the simulated engine revolutions value (RpmFinal) remains constantly below the engine idle value (RpmNldle) for a set, optionally configurable, period of time, the simulated engine shuts down.

In a 57th aspect according to any of the previous aspects, the control unit (4), after receiving the activation signal (11) and the setting of the simulated engine revolutions value (RpmFinal) to the default value, is further configured to send an activation signal to a vibration emulation system (200) of the electric propulsion vehicle (100).

In a 58th aspect according to any of the previous aspects, the vibration emulation system (200) includes a prefixed number of vibration generators, such as bass shakers, the control unit (4) varying the frequency and intensity of the vibration generator's vibrations as a function of the acceleration signal (5) and the simulated engine revolutions value (RpmFinal).

In a 59th aspect according to any of the previous aspects, with each variation of the simulated gear inserted value (GearInserted), the vibration emulation system (200) will reproduce a gear shifting vibration, the gear shifting vibration adding to further vibrations generated by the vibration emulation system (200).

In a 60th aspect according to any of the previous aspects, the control unit (4) is configured to compare the simulated engine revolutions value (RpmFinal) with an engine idle value (RpmNldle) of the simulated endothermic combustion vehicle, If the simulated engine revolutions value (RpmFinal) remains constantly below the engine idle value (RpmNldle) for a set, optionally configurable, period of time, the simulated engine shuts down and the vibration emulation system (200) will reproduce an unregulated engine shutdown vibration, stopping the reproduction of other vibrations.

In a 61st aspect according to any of the previous aspects, the vibration emulation system (200) includes a prefixed number of vibration generators, the control unit (4) controlling the vibration generators through one or more control signals function at least of the simulated engine revolutions value (RpmFinal), the acceleration signal (5), the simulated gear inputvalue (GearInserted), a clutch signal (2*a*) and the requested simulated torque value (TorqueFinal).

In a 62nd aspect according to any of the previous aspects, the vibration emulation system (200) includes a prefixed number of vibration generators, the control unit (4) controlling the vibration generators through one or more control signals function at least of sounds emitted through the sound simulation routine.

In a 63rd aspect according to any of the previous aspects, the sound simulation routine reproduces the sound of the electric propulsion vehicle (100) according to the acceleration signal (5) and the simulated engine revolutions value (RpmFinal), in particular the routine reproducing said sound before the end of the sampled starting sound emission.

In a 64th aspect according to any of the previous aspects, the sound simulation routine reproduces the sound of the electric-powered vehicle (100) dynamically performing a plurality of audio tracks pre-stored for the specific vehicle simulated combustion endothermic, in particular the plurality of audio tracks being added to increase the realism of reproduction.

In a 65th aspect according to any of the previous aspects, the emulator also includes audio speakers (202) positioned at a simulated exhaust and at the simulated engine, the sound simulation routine will reproduce a sound at the portion of the simulated vehicle with endothermic combustion where such sound was generated, for example a sound of the cut-off detonations being reproduced at the simulated exhaust at the rear of the vehicle with electric propulsion (100).

In a 66th aspect according to any of the previous aspects, to every variation of the value of simulated inserted gear (GearInserted), the routine of simulation of the sound will reproduce a sound of graft gear, the sound of graft gear adding to other sounds generated by the routine of simulation.

In a 67th aspect according to any of the above aspects, the control unit (4) is configured to compare the simulated engine revolutions value (RpmFinal) with an engine idle value (RpmNldle) of the simulated endothermic combustion vehicle, if the simulated engine revolutions value (RpmFinal) remains constantly below the engine idle value (RpmNldle) for a set, optionally configurable, period of time, the simulated engine will shut down and the sound simulation routine will reproduce a sampled sound of the engine stall, stopping the playback of other sounds.

In a 68th aspect according to any of the previous aspects, the sound simulation routine is configured to reproduce sounds that vary depending at least on the value of simulated engine revolutions (RpmFinal), the acceleration signal (5), the value of simulated gear input (GearInserted), a clutch signal (2*a*) and the value of requested simulated torque (TorqueFinal).

In a 69th aspect according to any of the previous aspects, the sound simulation routine is configured to vary a sound emission volume as a function of the acceleration signal (5).

In a 70th aspect according to any of the above, the sound simulation routine is configured to send audio tracks, for example wirelessly, to an accessory, such as headphones or infotainment speakers.

In a 71st aspect, an electric propulsion vehicle (100), in particular a motorcycle, is provided, including an emulator according to any of the above aspects.

In a 72nd aspect according to any of the previous aspects, the vehicle has direct transmission to the wheel.

In a 73rd aspect according to any of the previous aspects, the vehicle has a direct transmission to the wheel, in particular without using a gear selector or a clutch connected to the control unit (105) of the electric vehicle (100).

In a 74th aspect according to any of the previous aspects, the vehicle is a pure electric vehicle, i.e. without other different propulsion systems (e.g. it is not a hybrid vehicle).

In a 75th aspect according to any of the previous aspects, the vehicle includes a clutch (101) equipped with a first sensor (2) configured to emit a clutch signal (2*a*) relative to the position of the clutch (101) of the electric propulsion vehicle (100), in particular said clutch (101) being a fake clutch, i.e. not connected to a control unit (105) of the electric propulsion vehicle;

a gear shift selector (102) equipped with a second sensor (3) configured to emit a gear change signal (3*a*) relative to the position of the gear shift selector (102) of the electric propulsion vehicle (100), in particular said gear shift selector (102) being a fake gear shift selector, i.e. not connected to a control unit (105) of the electric propulsion vehicle.

In a 76th aspect according to any of the previous aspects, the emulator (1) is connected in bypass on a cable connecting an accelerator (103) of the electric propulsion vehicle (100) and the control unit (105), the emulator (1) receiving the acceleration signal (5) coming from the accelerator (103) and supplying in output the accelerator control signal (OutputThrottle) sending it to the control unit (105).

In a 77th aspect according to any of the previous aspects, the emulator (1) is connected to the control unit (105) and the control unit (4) controls the control unit (105) to deliver the requested simulated torque value (TorqueFinal) and/or the calculated requested simulated power (18).

In a 78th aspect according to any of the previous aspects, the emulator (1) is connected to the CAN bus to receive the vehicle speed signal (6) and/or the engine revolutions signal (7).

In a 79th aspect according to any of the previous aspects, the emulator (1) is connected to ABS sensors and/or a speedometer to determine the vehicle speed and/or the engine revolutions value (RpmExt) of an electric motor (104) of the electric propulsion vehicle (100), e.g. by a multiplication factor.

In an $80^{th}$ aspect according to any of the previous aspects, the acceleration signal (5) is a percentage acceleration signal (AccPercentage) or an acceleration signal filtered based on the clutch position (AccPercentageClutchFiltered), for example calculated according to the following relation:

$$AccPercentageClutchFiltered = ClutchPercentage/100 * AccPercentage$$

BRIEF DESCRIPTION OF THE DRAWINGS

Embodiments and aspects of the invention will be described below with reference to the enclosed drawings, provided for indicative purposes only, and therefore not limiting, in which:

FIG. 2 shows the architecture of an emulator according to the following description;

CONVENTIONS

Figure 1:
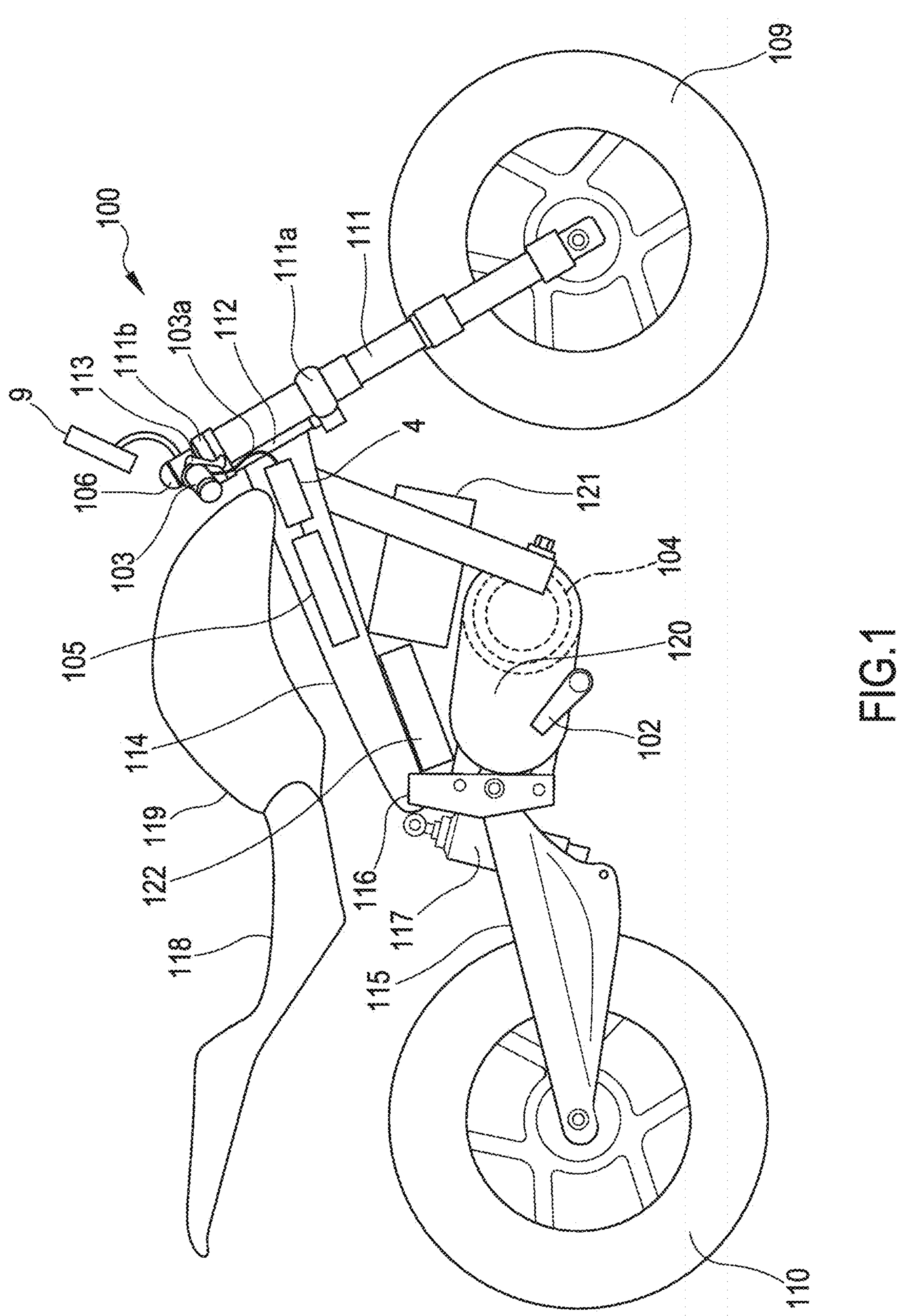
FIG. 1 is a schematic side view of an electric motorcycle equipped with an emulator of performance, sound and vibration.

Please note that in this detailed description corresponding parts illustrated in the various figures are indicated with the same numerical references. The figures could illustrate the object of the invention by means of non-scale representations; therefore, parts and components illustrated in the figures relating to the object of the invention could be only schematic representations.

Definitions

Control Unit

The equipment described and claimed herein includes at least one control unit responsible for controlling the operations carried out by the equipment. The control unit can obviously be a single one or be formed by a plurality of distinct control units depending on the design choices and operational needs.

The term control unit means a component of electronic type which may include at least one of: a digital processor (e.g. including at least one selected in the group between: CPU, GPU, GPGPU), a memory (or memories), an analog circuit, or a combination of one or more digital processing units with one or more analog circuits. The control unit can be "configured" or "programmed" to perform certain steps: this can be achieved in practice by any means that allows you to configure or program the control unit. For example, in the case of a control unit comprising one or more CPUs and one or more memories, one or more programs may be stored in appropriate memory banks connected to the CPU or CPUs; the program or programs contain instructions which, when executed by the CPU(s), program or configure the control unit to perform the operations described in relation to the control unit. Alternatively, if the control unit is or includes analog circuitry, then the control unit circuit can be designed to include circuitry configured, in use, to process electrical signals in order to perform the steps related to the control unit. The control unit may comprise one or more digital units, e.g. of the microprocessor type, or one or more analogue units, or an appropriate combination of digital and analogue units; the control unit may be configured to coordinate all actions necessary to execute an instruction and instruction set.

Memory

The term memory means an element or elements of an electronic system dedicated to the storage of data, i.e. one or more devices capable of storing data pending their subsequent use. The memory can be volatile or non-volatile and of different nature such as RAM, ROM, EPROM, MRAM, NVRAM, EEPROM, FLASH, magnetic media for data storage, optical media for data storage or similar. The memory may consist of a single storage bank or of a number of storage banks, even of a different nature, to which the control unit has access (e.g. sequential, direct or random) depending on the requirements in terms of reading and/or writing.

Electric Propulsion Vehicle or Electric Vehicle

An electric vehicle is a means of transport that uses an electrically powered system that is generally powered by rechargeable batteries for its operation. Electric propulsion vehicles are extremely quiet. The electric vehicles of interest to the present invention are in detail the electric cars and electric motorcycles. The electric car is an electric motor car that uses as its primary energy source the chemical energy stored in one or more rechargeable batteries and made available by batteries to the motor in the form of electrical energy. An electric motorcycle (or electric scooter) is a two (or even three) wheeled vehicle that uses an electric motor to move.

The energy source of an electric motor is batteries, such as lithium-ion batteries. The electric motorcycle can be equipped with a regenerative braking system. This means that some energy can be recovered during braking, which recharges the batteries and increases the overall efficiency of the motor. The extreme simplicity and reliability of an electric motor drastically reduces its maintenance (it does not have cylinders, valves, carburetor, does not require oil change, etc.) and greatly increases the service life of the electric motorcycle.

In this description, an electric propulsion vehicle is an electric propulsion vehicle which has a direct transmission to the wheel, without the use of a gearbox or clutch.

DETAILED DESCRIPTION

With reference to the above figures, the number 1 identifies a sound and performance emulator 1 for an electric propulsion vehicle 100. In more detail, emulator 1 is a sound, performance and vibration emulator for the electric propulsion vehicle 100 (also referred to as vehicle or electric vehicle).

The emulator includes a control unit 4, for example in the form of an electronic control unit that defines the heart of the system, directly connected or connected to control unit 105 of the electric vehicle 100 and/or on the CAN bus of the electric vehicle 100 and/or connected in by-pass mode on cable 103*a* of the accelerator 103 of the electric vehicle 100, as further explained below.

The Electric Propulsion Vehicle

By way of example, the following description will refer to an electric motorcycle as a specific electric vehicle; however, emulator 1 and all its functionalities are equally usable in relation to any electric propulsion vehicle when it is necessary to emulate a corresponding endothermic simulated vehicle (e.g. a car).

In relation to FIG. 1, it shows a right side view of an electric motorcycle (electric propulsion vehicle 100) which includes a front wheel 109 and a rear wheel 110 (e.g. a drive wheel). The front wheel 109 is mounted in a rotating manner on the lower portions of a pair of front right and left forks 111 that extend substantially vertically.

Figure 1A:
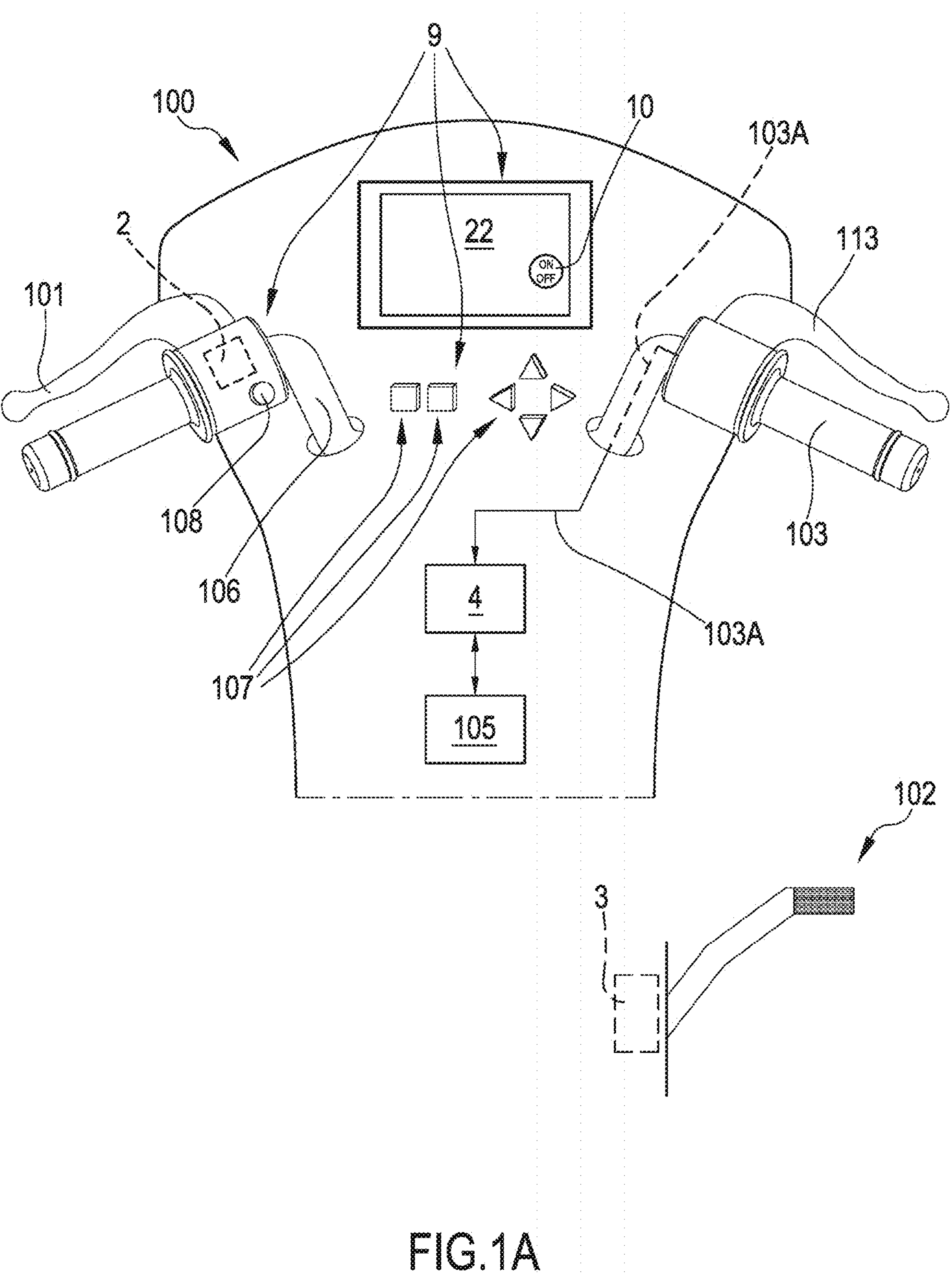
FIG. 1A is a schematic top view of an electric vehicle equipped with an emulator.

The upper parts of the front forks 111 are mounted on a steering shaft (not shown) by means of a pair of upper and lower brackets 111*a*, 111*b*. The steering shaft is supported in rotation in a condition where it is inserted into a head tube 112 of the vehicle body. A handlebar 106 is attached to the upper bracket 111*b*, which extends to the right and left and is visible in more detail in FIG. 1A. A driver rotates the handlebar 106 to the right or left to steer the front wheel 109. Accelerator 103 is located on the right side of the handlebar 106. The accelerator 103 grip is handled with the driver's right hand and rotated by turning the wrist. In front of the accelerator 103 there is a brake lever 113. A fixed handle, gripped by the driver's left hand, is located on the left side of the handlebar 106 and a clutch lever 101 is located in front of the fixed handle. It should be noted, however, that the electric propulsion vehicle is an electric propulsion vehicle which has a direct transmission to the wheel, without the use of a gearbox or clutch. In other words, the clutch lever 101 mentioned above does not send any signal or command to the 105 control unit of the vehicle, i.e. it is a fictitious clutch that has only the purpose of simulating a real clutch lever. As explained below, clutch 101 is associated with a first position sensor of the clutch lever that sends the signal to control unit 4 of the emulator and not to the ECU control unit 105.

The frame 114 of the electric motorcycle 1 extends longitudinally in side view and is tilted slightly downwards. A front part of a large fork 115 supporting the rear wheel 110 is mounted on a swivel frame 116 so that the fork 115 is vertically rotatable around the front. A rear suspension 117 is placed between an intermediate part of the fork 115 and a rear part of the main frame 114. A seat 118 is located above the fork 115 and a fake tank (or compartment) 119 is located in front of the seat 118.

A 120 housing supports a gear shift selector 102 and houses inside an electric motor 104 to generate power and transmit it to the rear wheel 110. Note again that the electric propulsion vehicle is an electric propulsion vehicle that has direct wheel drive, without the use of a gearbox or clutch. In other words, the above-mentioned gear shift selector 102 does not send any signal or command to the vehicle's control unit 105, i.e. it is a fictitious gear shift selector 102 that only serves to simulate a real gear shift lever or pedal. As explained below, the gear shift selector 102 is associated with a second position sensor that sends the signal to control unit 4 of the emulator and not to the ECU control unit 105.

A battery 121 is located above the housing 120 to supply electricity to the electric motor 104. An inverter 122 is also located above housing 120 to convert the direct current of battery 121 into alternating current and supply alternating current to electric motor 104, or convert the alternating current (regenerative electrical energy) generated by electric motor 104, operating as a generator, into direct current to charge battery 121 with direct current. An ECU controller 105 (vehicle controller) is located to and associated with the main chassis 114.

As also schematically represented in FIG. 1, a control unit 4 of emulator 1 is also associated with the main frame 114 of the vehicle and, specifically, is in bypass condition on the accelerator 103, or intercepts an acceleration signal 5 that runs along the cable 103*a* before the signal reaches the control unit 105 of the vehicle 100. Control unit 4 is itself connected to control unit 105 and/or to the motorcycle CAN bus (if present).

Emulator Architecture

As shown in FIG. 2, emulator 1 includes the aforementioned control unit 4, which receives a plurality of input signals 12, including main signals 12*a* and secondary signals 12*b*. The main signals are used for the processing of vehicle parameters and control values and include acceleration signal 5 for the position of the accelerator 103 of the electric propulsion vehicle 100 and vehicle speed signal 6 for the speed of the electric propulsion vehicle 100, which is not only shown on the vehicle's display 22, but is also used to determine the value for engine revolutions (RpmExt) of the electric motor 104 of the electric propulsion vehicle 100; this value of the real revolutions of the electric motor can also/alternatively be obtained directly by receiving the motor revolutions signal 7 relative to the engine revolutions (RpmExt) of the electric motor 104.

In addition, control unit 4 also receives the clutch signal 2*a* from the first position sensor 2 of the clutch 101 and the gear signal 3*a* from the position of the gear selector 102 of the electric propulsion vehicle 100, which is transmitted by the second position sensor 3.

As also explained below, the control unit will receive the acceleration signal 5 in the form of an accelerator voltage signal, the clutch signal 2*a* in the form of a clutch voltage signal, and the gear signal 3*a* in the form of a voltage signal/analog-switch from the second gear sensor 3, the vehicle speed e.g. via CAN bus or extractable from the engine speed given the direct transmission, and the value of the electric motor speed e.g. via CAN bus or extractable from the vehicle speed given the direct transmission.

Among the secondary signals 12*b*, control unit 4 may receive one or more of a feedback signal of the regenerative braking value of the electric motor, the signal from the accelerometers placed on the vehicle, the signal from the yaw sensor, the GPS signal, ESP, battery percentage, torque request and others depending on the presence or absence of their respective sensors and the connection or absence (and the predisposition to receive them or not) of control unit 4 to the CAN bus or control unit 105 of the electric vehicle.

Control unit 4 can also be connected wirelessly (or by cable) to an external mass memory 32, such as the memory of a mobile device (mobile phone, tablet, computer, etc. . . . ) to exchange data with it and receive, for example, data packets relating to one or more types of endothermic combustion vehicles to be simulated. It can also be connected wirelessly (or by cable) to an accessory 33, such as a wearable device, for sound reproduction. The wireless link can be of any type suitable for transmission, such as a Bluetooth® link.

For sound reproduction, control unit 4 is interfaced with an audio system 201 with amplification and filter for the typical sounds of a combustion engine; the audio system 201 includes a sound card and sound reproduction boxes 202 such as speakers (tweeter, subwoofer, woofer, soundbar) for sound emulation.

In addition, control unit 4 is also connected to a vibration emulation system 200 of the endothermic motor; the vibration emulation system 200 includes a prefixed number of vibration generators, such as bass shakers that will be positioned at least on frame 114, platforms and handlebars 106.

The architecture of emulator 1 described above will process in real time the mentioned input signal 12 generating a package of commands related to performance, sound and vibration to be simulated to obtain an overall simulation and real simulated endothermic combustion vehicle. With this system you can faithfully simulate the performance of any vehicle with performance equal to or less than that of the vehicle with electric motor used for emulation.

Control unit 4 activates and performs an emulation module (PE) that includes a simulated endothermic combustion vehicle performance simulation routine and a simulated endothermic combustion vehicle sound simulation routine (ISE). The two PE and ISE modules exchange data with each other and send the respective control signals to the vibration emulation system for selective activation. The architecture of emulator 1 takes advantage of the Middleware functionality derived from gaming for the creation of sound in real time interactive mode by communicating with the two main logic modules PE and ISE. In addition, the ISE module in turn controls the audio system appropriately.

ISE's software architecture is interactive intelligent, i.e. it processes the requests of the PE module in real time, generating "real emulation" sound packages using functions typical of gaming simulation. The PE module controls the electric vehicle by imposing the accelerator control signal (OutputThrottle) or directly imposing the requested simulated torque value (TorqueFinal) and/or the simulated power value required by the electric vehicle 100. In addition, the PE module controls the motor brake on the vehicle controller. The PE module reworks the input signals 12 converting them into percentage/digital values that can be used by the various software modules implemented in the system, it uses values, curves and maps that can be calibrated with different values for each vehicle to be simulated (as explained below). In this way you can choose to emulate faithfully the simulated vehicle, maintaining the same gear ratios, or adapt them to the electric vehicle in use so that the control unit 4 automates the gear ratio to what is the maximum speed of the electric vehicle (depending on the vehicle to emulate this function will act on the whole ratio or only on the highest ratios). In addition, the PE module will create virtual signals that will be sent to the vibration emulation system 200. Modulating the command will create vibrations that simulate the mechanical movements of the endothermic motor.

User Interface (Optional)

Emulator 1 can then include a user interface 9, i.e. a feedback display. Note that alternatively (or in addition) the dashboard of the electric vehicle as original equipment can also be used. User interface 9 is operationally connected to control unit 4 to exchange data with it.

User interface 9 comprises at least one start button 10 and control unit 4 is configured to determine the selective operation of the start button by receiving an activation signal 11 when the start button is pressed to activate the emulation module, if deactivated, or to deactivate, if active. As can be seen from FIG. 3, the user interface includes a display 22 and the control unit 4 is programmed to represent on the display an analogue and/or digital tachometer 23 representing a simulated engine revolutions value (RpmFinal) of the simulated endothermic combustion vehicle and/or a speed 24 of the electric propulsion vehicle 100 and/or the simulated gear value (GearInserted) of the simulated endothermic combustion vehicle and/or an identification number 25 of the simulated endothermic combustion vehicle model, and one or more technical configurations of the simulated endothermic combustion vehicle.

In a preferred form, user interface 9 includes a touch screen display 22 and control unit 4 is configured to represent the start button 10 on the display 22. In particular, the start button 10 changes configuration if the emulation module is activated (e.g. the green light in its inside as in FIG. 3) or deactivated (the green light shown may change color). A plurality of other navigation keys 27 (ex 4 directional keys) to navigate between the graphic or alphanumeric representations of the display 22 and select one and a confirmation key ('ok' or 'enter' key) to confirm a selection can also be represented on the touch screen display for direct activation by the user.

Figure 3:
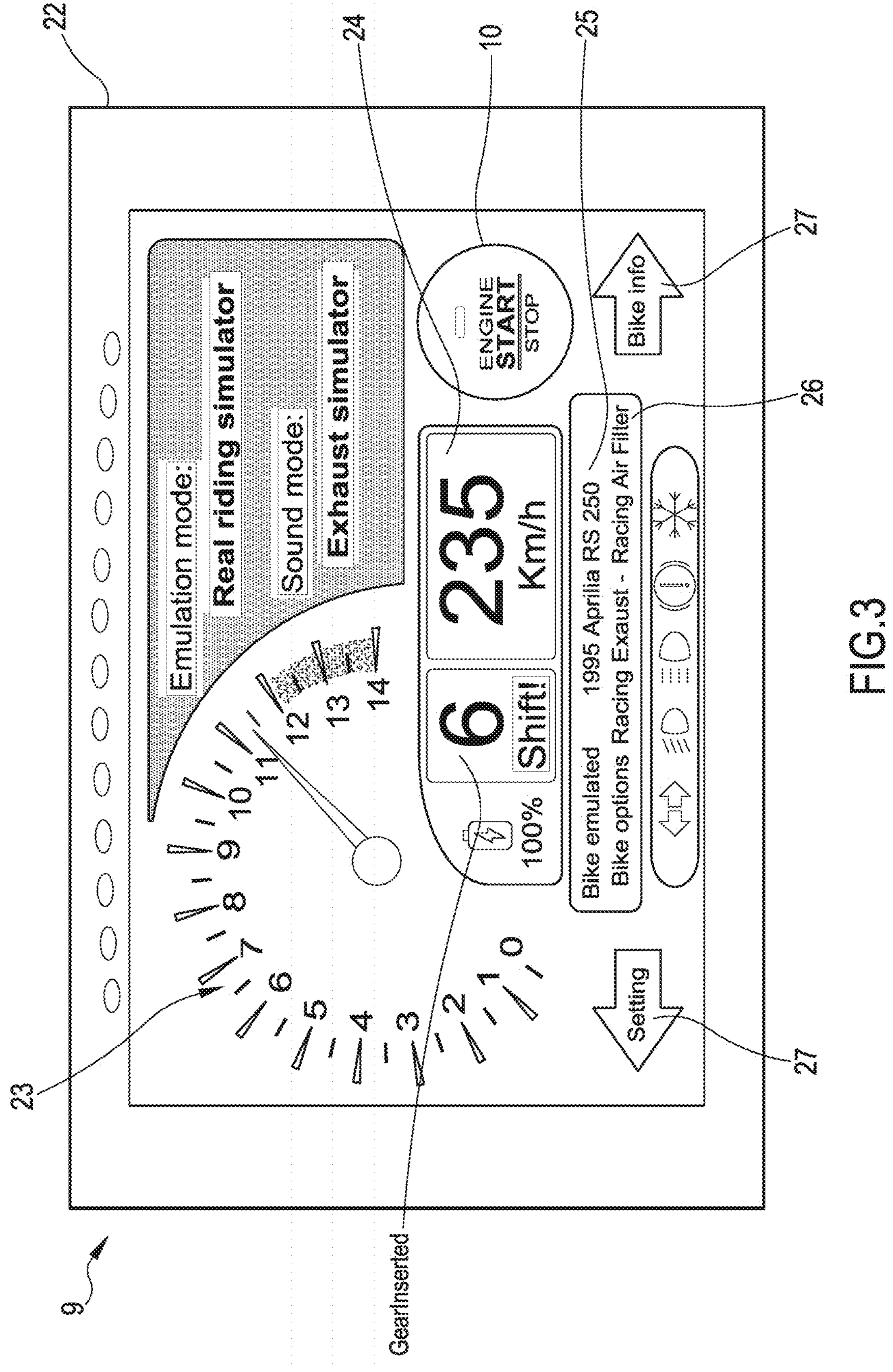
FIG. 3 is an exemplificative representation of a display to represent information about the emulator and the electric vehicle.

Although FIG. 3 shows a display 22 representing the start button 10 as a touch button (activated by touch with a finger), differently (or in combination), user interface 9 could include display 22 (which could also be the one already installed on the electric vehicle) and a number of physical buttons 107 (see FIG. 1A), in particular located in areas accessible to the user, for example on a handlebar 106 of the electric propulsion vehicle 100; physical buttons 107 are connected to control unit 4 to send the respective signals following the operation of the electric propulsion vehicle 100. For example, a prefixed number of navigation keys (ex 4 directional keys) can be provided to navigate between the graphic or alphanumeric representations of the display 22 and select one and a confirmation key ('ok' or 'enter' key) to confirm a selection. The physical keys may also include a return key to deselect a previous selection and return to a previous menu. Emulator 1 can be configured to provide dual management of the selection: by touch-screen 22 and/or by analogical commands 107 present on the handlebar 106 by means of the six keys mentioned above, four of which are directional, confirmation key and back key.

In summary, a typical display may have one or more of the following characteristics:

i. Revolution counter 23 representative of the simulated revolutions of the endothermic engine (RpmFinal);
ii. Real speed 24 of the electric vehicle;
iii. Simulated gear inserted value (GearInserted), N, 1, 2, 3, 4, 5, 6, 7;
iv. Driving mode—Riding mode
v. Sound mode
vi. Type of simulated vehicle 25 with endothermic engine—ex. Emulated Motorcycle
vii. Technical options 26 for the simulated vehicle—ex. aftermarket exhaust, sports filter, racing ecu, etc. . . .
viii. Info about the electric vehicle—ex. traction control level, battery percentage, etc.,
ix. Start button 10
x. Gear shift indicators
xi. Additional info—ex. hour, G-sensor, navigator, external source data, etc. . . .

In addition, a variety of driving screens with different graphics may be chosen.

Clutch (Optional)

Emulator 1 also includes a clutch 101 equipped with a first sensor 2 configured to emit a clutch signal 2*a* relative to the position of a clutch 101 of the vehicle 100. The clutch signal 2*a* is received and processed by control unit 4. In general, the first sensor 2 is a potentiometer and the clutch signal 2*a* is an analog signal, such as a voltage signal (e.g. between 0 and 5V), which is a function of clutch travel 101. In other words, depending on the position of the clutch lever, the potentiometer will transmit a signal between 0 Volt (clutch fully released) and a signal of 5 Volt (clutch fully activated).

Figures 4, 7:
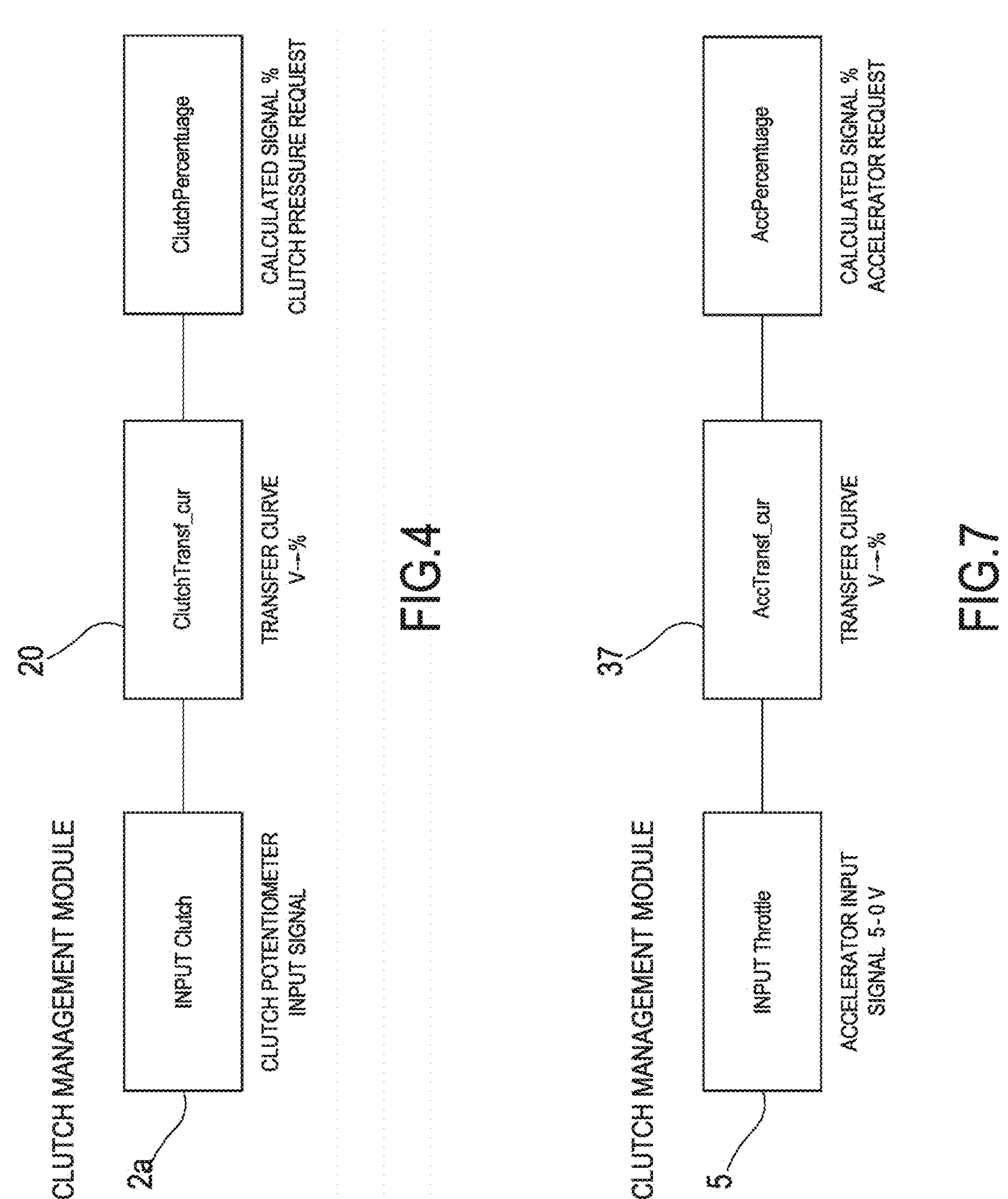
FIG. 4 shows a clutch signal management module.
FIG. 7 shows an acceleration signal management module.

Control unit 4 receives the voltage signal emitted by the potentiometer and is configured to convert the analogue signal into a percentage clutch signal by means of a specific conversion curve 20, which can be optionally calibrated (see FIG. 4). In other words, control unit 4 receives the clutch potentiometer voltage signal as input.

A software loaded on the control unit 4 converts the values from Volt to percentage values by means of the aforementioned calibratable curve 20, generating a clutch signal in percentage (ClutchPercentage), which is the percentage actuation value of the clutch. When the clutch is released the clutch signal in percentage (ClutchPercentage) is 0%, when the clutch is fully actuated the clutch signal in percentage (ClutchPercentage) is 100%. In fact, clutch signal 2*a* varies between a released clutch signal, e.g. 0% percentage value, and a fully actuated clutch value, e.g. 100% value. The clutch conversion curve will generally not have a linear calibration.

In fact, to simulate as faithfully as possible a traditional clutch can be calibrated leaving dead spots at the beginning and end of the mechanical stroke. Through the device settings on a user interface and/or through a specific App (or other application), the user can select, for example according to his preferences, at what point he wants the clutch to be released.

Figures 4A, 4B, 4C:
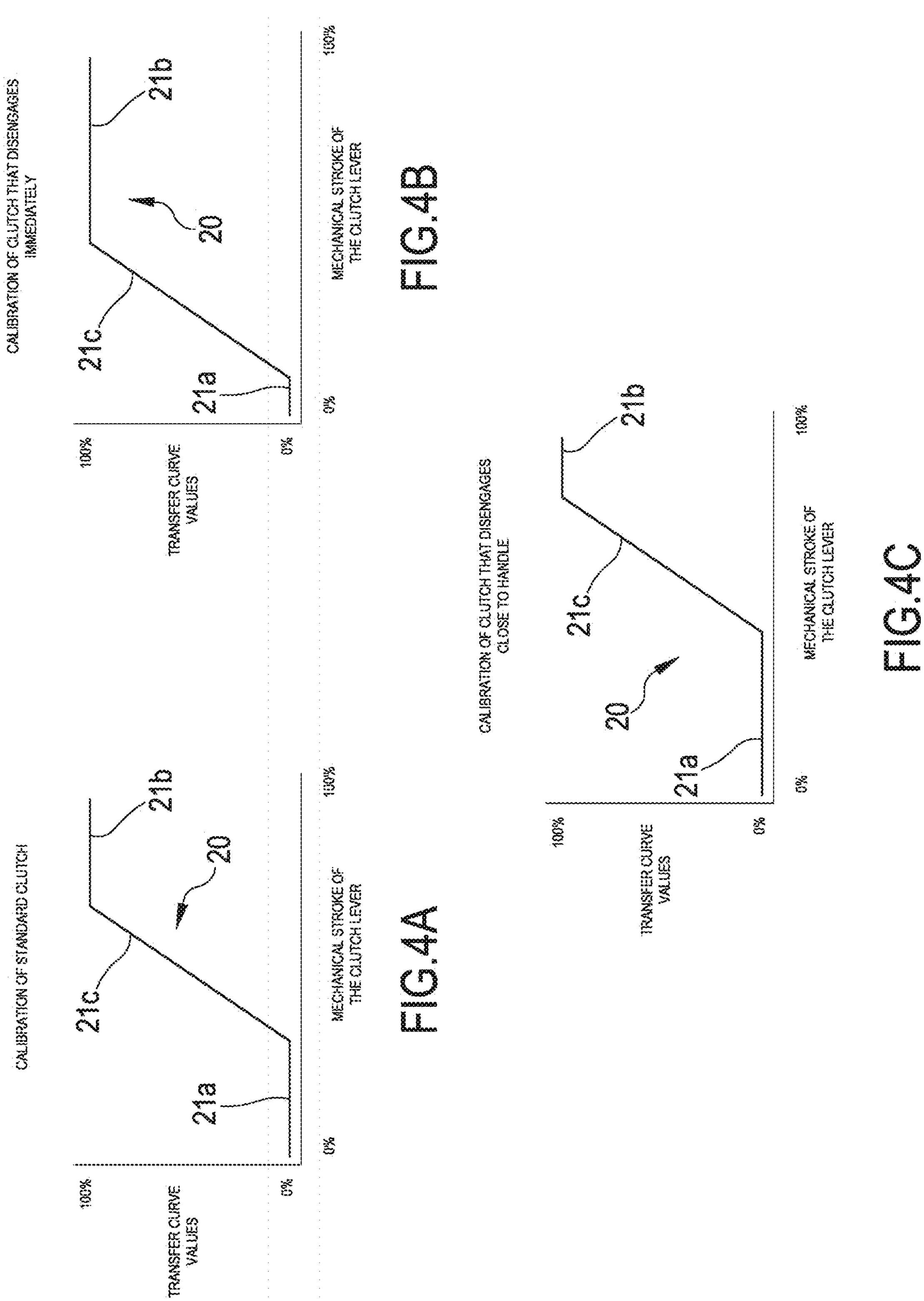
FIGS. 4A-4C show clutch calibration curves.

As shown in FIGS. 4a, 4b and 4c, the calibratable 20 curve comprises a first initial section 21a up to a pre-established analog signal value, wherein the percentage value does not vary with the variation of the analog signal, i.e. with the variation of the clutch stroke (the driver pulls the clutch for a certain initial stroke without any effect—initial dead point). The curve of FIG. 4b has a rather short initial dead point (short stroke), the curve of FIG. 4c a rather long initial dead point (long stroke), the curve of FIG. 4a is instead intermediate between the two previously mentioned.

Always as visible, the calibratable curve has a final section 21b, beyond a limit value of the analog signal, in which the percentage value does not vary with the variation of the analog signal, i.e. once the point where the final section 21b begins has been reached, the clutch is considered completely pulled. Sections 21a and 21b are essentially horizontal sections in the figures.

The calibration curve 20 then presents an intermediate section 21c between the prefixed value and the limit value of the analog signal, in which the percentage value varies between 0% and 100%, in particular the variation of the percentage value shown is a linear variation in the interval of the intermediate section. In other words, the intermediate section 21c is a segment of an inclined line. The inclination (which can be varied) defines the active stroke length of the clutch 101.

Although of lesser interest, the intermediate section may not be straight, but defined by another function of transfer between clutch stroke and the percentage value of the clutch signal 2a.

Note that at least one, and in particular at least two, between the prefixed value of the analog signal, the limit value of the analog signal and a slope of the intermediate section of the calibratable curve, are calibratable, i.e. predefined. In other words, the user can select the length of the first section 21a (i.e. the initial dead point), the length of the final section 21b (i.e. the final dead point) and the slope of the intermediate section (i.e. the use/active stroke length of clutch 101).

As previously indicated, the electric propulsion vehicle has a direct drive engine without gearbox and without clutch. Therefore, clutch 101 is in fact a fictitious component for the motorcycle. Clutch 101 does not send/receive any signal to the 105 control unit of the 100 vehicle.

Gear Shift Selector (Optional)

Figure 5:
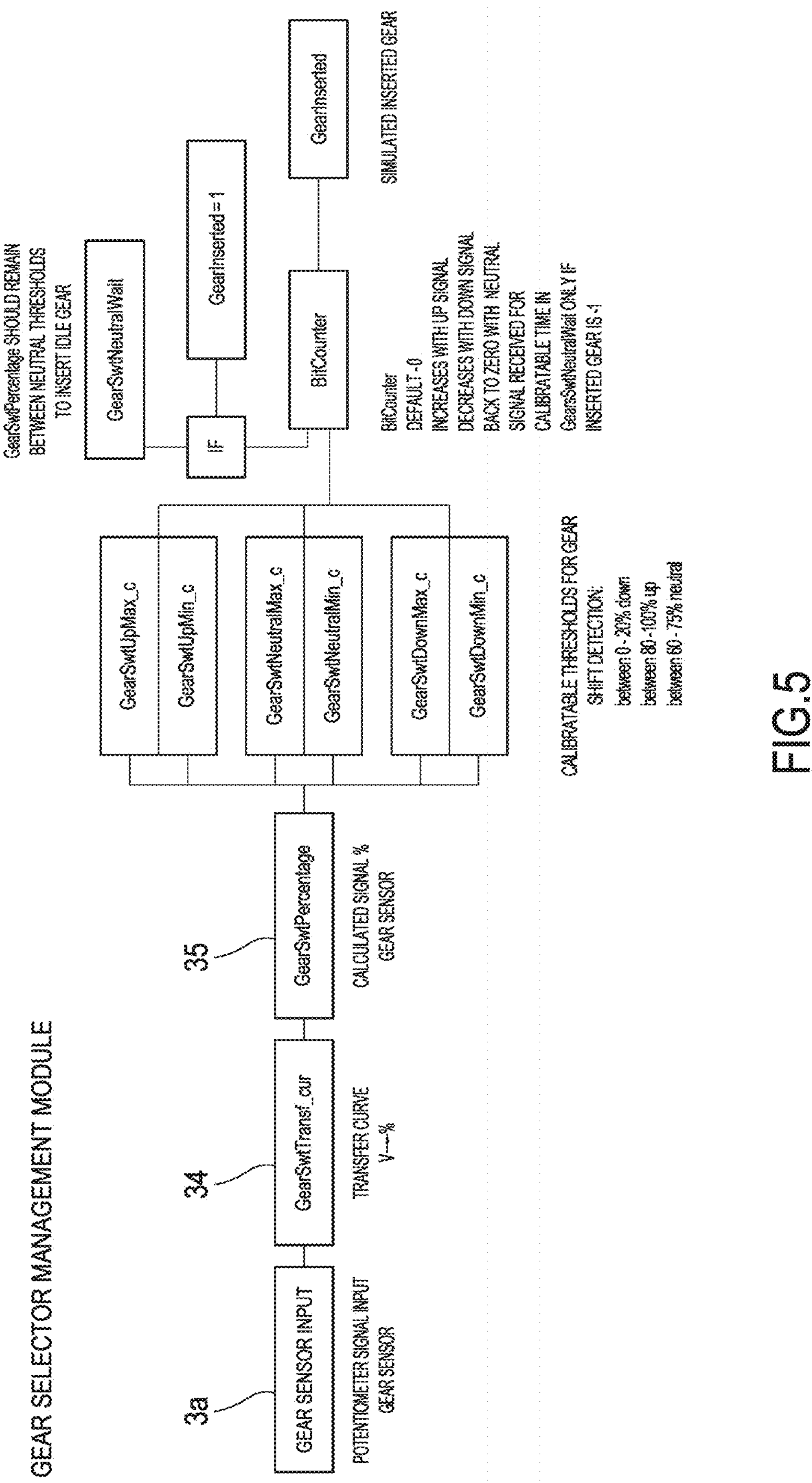
FIG. 5 shows a gear signal management module.

Emulator 1 then includes a gear shift selector 102 (or gear shift pedal with position sensor) equipped with a second sensor 3 configured to emit a gear signal 3a relative to the position of gear shift selector 102. Control unit 4 is configured to receive further gear signal 3a, which varies between an upper position signal and a lower position signal. The second sensor 3 is preferably also a potentiometer and the gear signal 3a is an analogue signal, such as a voltage signal, which is a function of the gear shift selector 102 travel; again, control unit 4 is configured to convert the analogue signal into a percentage gear signal by means of an optionally calibratable conversion curve 34 (see FIG. 5). A control unit 4 software receives the input voltage signal of the gear shift selector 102 potentiometer and converts the values from Volt to percentage by means of a corresponding calibratable curve, generating the percentage actuation value 35 of the gear shift lever.

The gear management software module has a default value of 50% because mechanically the gear shift selector, if not activated, remains fixed in the same position as a gear lever of a traditional motorbike with endothermic engine. Pressing the gear shift selector downwards, the value varies linearly until the minimum mechanical travel is reached, which is equivalent to the 0% signal; pulling the gear shift selector upwards varies linearly the signal emitted by the sensor and therefore the percentage value converted by the software until the maximum mechanical travel is reached, which is equivalent to the 100% signal. The output value from the gear input calculation module of control unit 4, called the simulated gear input value (GearInserted) is 0 by default and can increase/decrease from 0 to N in steps of 1 (wherein N represents the maximum number of simulated gears, for example 6). The value 0 indicates idle, the values from 1 to N (ex 6) identify the simulated gears entered.

In other words, control unit 4 is configured to determine the GearInserted value of the simulated endothermic combustion vehicle, between a minimum value equal to zero and a maximum value configurable, for example equal to six, increasing or decreasing by one unit the GearInserted value according to receiving the upper position signal or the lower position signal of gear shift selector 102. When Control Unit 4 receives the upper position signal, it increases the simulated GearInserted value by one unit and when it receives the lower position signal, it decreases the simulated GearInserted value by one unit. Depending on the calibratable windows in which the lever is moved, the software increases or decreases the gear. By default, with the simulated gear input value, i.e. the percentage actuation value 35 (GearSwtPercentage) between 0% and 20%, control unit 4 decreases the value of the simulated gear input by 1, with the simulated gear input value (GearSwtPercentage) between 80% and 100% it increases the value of the simulated gear input by 1. Note that the GearSwtPercentage must always exit the calibratable windows before you can increase or decrease the GearInserted value again. Just as an example, the values of the gear inserted simulated (GearInserted), using the windows 0-20% and 80-100% increase or decrease between 1 and 6 the gears inserted simulated. Only if the simulated GearInserted value is equal to 1, and an intermediate window of the simulated GearSwtPercentage value is entered that goes—for example—from 60% to 75%, the software in charge of control unit 4 starts to calculate the time that the user keeps gear selector 102 in this position. When a preset time is reached (calibratable, e.g. 1500 ms), the software returns the GearInserted gear value to 0, inserting the idle gear.

In fact, if the GearInserted value is equal to 1, control unit 4 is configured to determine whether the gear signal 3a is representative of an intermediate position, within a set interval, between a middle rest position and a higher maximum travel position or a lower maximum travel position; if the gear signal 3a remains representative of the intermediate position assumed for more than one set time, the GearInserted value returns to zero, i.e. when the simulated gear is not engaged.

It will not be possible to enter the simulated gear with the tripod open; in this case the warning message will appear on the display 22.

In expert driver simulation mode, gear shifting and the relative increase in value on the display will only be allowed if the user performs a correct maneuver (clutch operation, pedal gear selection): if the user attempts to engage the gear without pressing the clutch, control unit 4 will not allow gear engagement and the ISE sound emulation module will additionally generate the typical scratched sound. In the event of correct operation, the user will hear the sound of the mechanical gear shift engagement, and the gear indicator on the display will update instantly.

Control unit 4 sends a signal to the ISE sound emulation module at each gear change, which will reproduce the gear shift sound, which will be added to the sounds already being played. The same signal will be used to send the signal to the bass-shaker on the frame that will emit a vibration to simulate the mechanical engagement of the gear.

If the clutch-percentage signal is less than 90% (calibratable) in expert driver simulation mode, the ability to engage gears is inhibited and if you enter the shifting windows, a signal is sent to the ISE sound emulation module that will reproduce the sound of the scratched signal. The same signal will be used to send the signal to the bass-shaker that will emit a vibration that simulates the wrong maneuver.

As previously indicated, the electric propulsion vehicle has a direct drive engine without gearbox and without clutch. Therefore, the aforementioned gear selector 102 is in fact a fictitious component for the motorcycle. The gear selector 102 does not send/receive any signal to the control unit 105 of the vehicle 100.

Startup and Initial Settings

When the vehicle is switched off (Key-Off or no key inserted), control unit 4 will be in stand-by just like the vehicle's control unit/controller (e.g. electric motorcycle). After activation by key (Key-On) a wake-up signal 36 will be provided to control unit 4 and also to display 22 of the user interface.

On the display it will be possible to select between the original driving mode (standard driving—i.e. factory configuration as an electric vehicle—the emulator will in fact be totally inactive and transparent) or the emulation mode of an endothermic motor vehicle, thus selecting the type of vehicle and the options or technical configurations of the latter. By selecting the emulation mode, the system will allow you to choose the emulation configuration according to the block diagram in FIG. 6.

A memory 8 (operationally connected to control unit 4) contains a selection list from among a number of endothermic combustion vehicles to be simulated. Using the display and navigation keys 17; 107 it is possible to select the endothermic combustion vehicles to be simulated. Control unit 4 performs a vehicle selection module to allow a user to select one of the vehicles from the list (block 29 in FIG. 6). Each vehicle in the list is then associated with a corresponding data package (contained in memory 8) specific to the selected vehicle and including, inter alia, performance data, calibration and sound, and also corresponding vibration data. After selecting a vehicle from the list, Control Unit 4 displays a list of technical options directly associated with the selected vehicle and the selection module allows the user to select one or more of the technical options associated with the selected vehicle (block 30 in FIG. 6); consequently, the corresponding vehicle-specific data package is a function of both the selected vehicle and each selected technical option. In the example shown in FIG. 3, the vehicle selected to emulate is an Aprilia RS 250 1995 motorcycle with activated technical options: race exhaust and sport filter (Racing Exhaust—Racing Filter). Following the configuration chosen by the user, control unit 4 will access in memory 8 the corresponding performance, sound and vibration calibration package(s). The calibration packages will be called "BikeBox" and this strategy allows using a single software container with infinite calibrations without having to act on the emulation code as explained below. The calibration packages (BikeBox) will be organized in memory with "root" architecture with multiple levels of calibration according to user choice. For example, inside the BikeBox of an Aprilia RS 250 1995 with racing exhaust and sports filter (selectable as options individually), there will be 4 calibration packages, each of which contains all the calibration files, maps, curves, etc. . . . Selecting independently exhaust or filter, you will change both the engine delivery and the exhaust sound, and consequently all the calibration files. Control unit 4 can then manage each option by accessing an independent calibration package. In memory 8 of emulator 1 it will be possible to install a number of different BikeBoxes depending on the storage capacity. It will also be possible to manage the storage of calibration packages on removable devices (ex device 32 in FIG. 2).

Figure 6:
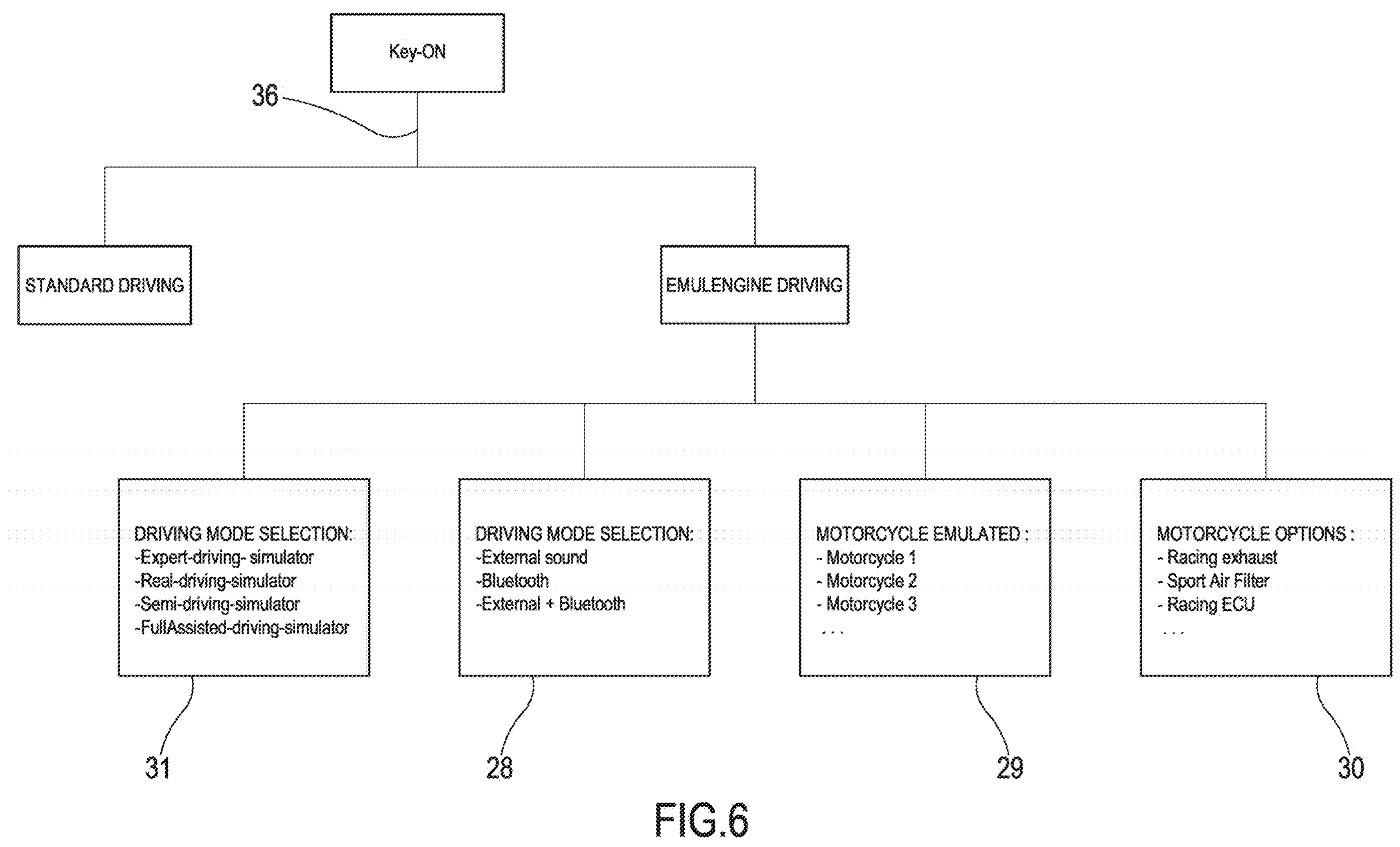
FIG. 6 is a block diagram that illustrates how to set up the emulator and the options for setting it.

Among the options, the user can also decide on a type of driving experience among a plurality of possibilities that includes: an expert driving simulator mode, a real driving simulator mode, a semi-automatic driving simulator mode, a fully assisted driving simulator mode (block 31 in FIG. 6).

In expert driving simulator mode, the emulator generates a faithful reproduction of the vehicle behavior in which the gear change must be done manually and the clutch used in the right manner. There are no software assists.

In the real driving simulator mode, you will need the clutch to start, but the engine will not shut down if it is released quickly. If you change without clutch, you will hear the noise of the scratch, but the action will be successful. Under sub-regime conditions, you will hear a rattling noise, but you will not hear the on-off movement of the electric motor.

In the semi-automatic driving simulator mode, the emulator will automatically manage the clutch and there is only the need to enter the gears physically. There is therefore no need to use the clutch. Holding the gear shift lever selector for n (ex. 3) seconds in the simulated gear reduction direction will engage idle gear.

In the fully assisted driving simulator mode, the emulator will simulate the output, sound and gear ratio of the vehicle to be simulated by automatically managing starts and changes, as if there were a robotic gearbox in automatic mode with the same number of ratios of the original vehicle on the vehicle to be emulated.

The user can also select an audio option to decide whether the emulator should emit sounds to the external environment, or only to an accessory 33, such as the earphones in a helmet or the infotainment speakers of a car (possibly overlapping the audio tracks reproduced by the accessory 33), or both to the external environment, or to the accessory (block 28 in FIG. 6). The audio signal can be sent either by cable or wireless (ex Bluetooth®).

In the first option, Control Unit 4 will use the speakers mounted outside the vehicle to emit the sound of the emulated vehicle and, as with a normal internal combustion engine vehicle, the noise will be audible to anyone in the vicinity, replicating the same decibels as the simulated vehicle. In the second option, control unit 4 will inhibit the use of the vehicle's external speakers and transmit the audio signal to the accessory (including wireless or Bluetooth®). In the case of motorcycles can be coupled to the earphones in the helmet, while in the case of a car at the speakers of infotainment. For original equipment on cars, infotainment, in case of emulation and second option activated, control unit 4 will submerge the sound of the emulator to that of the audio source played, so as not to lose functionality.

You can also decide whether or not to activate vibration emulation.

Configurable options include the possibility that control unit 4 is active to control regenerative braking and simulate an endothermic vehicle engine brake.

As an option that can be activated, it will also be possible to select a default mode (configurable) or the “remember previous choice” mode in the options menu of the display or app, so that it’s not necessary to repeat all the selections at the new start, but only modify those that are no longer of interest.

Vehicle Ignition and Acceleration in Neutral when the Vehicle is Stationary

As mentioned above, control unit 4 is configured to receive and/or react to receiving the activation signal 11 (i.e. the user who has touched/pressed the start button 10) subject to the activation of the electric propulsion vehicle 100 by key (or transponder or similar vehicle start authorization system). In addition, as an additional safety system, control unit 4 is configured to only react to receiving the activation signal if another physical safety key 108 on the handlebar is pressed. If this action is not taken, a message will appear on the display 22 reminding you to press the safety button beforehand. At this point, by pressing the start button 10, the user will hear the sounds and vibrations typical of starting the endothermic engine and will see the increase in engine revolutions on the simulated tachometer. Once the idle speed has been reached, the user will hear the sounds and vibrations typical of the endothermic vehicle simulated at idle speed and the engine speed will be shown on the display 22.

In more detail, after starting, the control unit 4 brings a value of simulated engine revolutions in neutral (RpmN) from 0 (default value of the system) to a value of idle speed (RpmNldle), for example equal to 1500 rpm; this value is calibratable and is saved in the mass memory 8 of the system. In this condition, with the gear in neutral, when driving, control unit 4 starts to calculate iteratively a value of simulated engine revolutions in neutral (RpmN(t)) at the current time t as a function of the acceleration signal 5 (and specifically the clutch signal in percentage) and the value of simulated engine revolutions in neutral (RpmN(t−1)) at the preceding time t−1. In detail, iterations are performed at Δt time intervals; these intervals are regular and calibratable, the default setting is 125 ms. The step of control unit 4 to calculate iteratively the value of the simulated engine revolutions at the current time t is a step of determining, according to the acceleration signal 5 (and specifically the clutch signal in percentage) and the value of simulated engine revolutions in neutral (RpmN(t−1)) at the preceding time t−1, a number of variation, positive or negative, of simulated engine revolutions to be added to the value of simulated engine revolutions in neutral (RpmN(t−1)) at the preceding time t−1. From the implementation point of view (and not limiting), memory 8 operationally includes at least one calibration map (as from the below example) in which following an input function of the acceleration signal 5 (AccPercentage−in a first example), or a filtered acceleration signal (AccPercentageClutchFiltered), and an input function of the number of simulated engine revolutions in neutral (RpmN(t−1)) at the instant of preceding time t−1 is uniquely associated with a number of variation of simulated revolutions.

In the following example we refer to the acceleration signal 5 called ‘AccPercentage’, however the same approach is also valid using the filtered acceleration signal (AccPercentageClutchFiltered) which is linked to the previous one by the following relation:

AccPercentageClutchFiltered=ClutchPercentage/100*AccPertentage

Therefore, in the RpmNnorm_map used to calculate the number of revolutions in neutral or pulled clutch, to simulate the inertia of the rise of the revolutions of the simulated RPM during the release of the clutch with gear engaged, on the Y axis instead of the signal AccPecentage, the value of the acceleration signal filtered AccPercentageClutchFiltered, that is calculated according to the previous formula, can be used.

| | | RpmN | | | | | | | | | |
|---|---|---|---|---|---|---|---|---|---|---|---|
| RpmNNorm_map | | 0 | 1000 | 1500 | 2000 | 2500 | 3000 | 3500 | 4000 | 4500 | 5000 |
| AccPercentage | 0 | 0 | 0 | 0 | −500 | −500 | −500 | −500 | −500 | −500 | −500 |
| | 10 | 0 | 0 | 500 | 0 | −500 | −500 | −500 | −500 | −500 | −500 |
| | 20 | 0 | 0 | 500 | 500 | 0 | −500 | −500 | −500 | −500 | −500 |
| | 30 | 0 | 0 | 500 | 500 | 500 | 0 | −500 | −500 | −500 | −500 |
| | 40 | 0 | 0 | 500 | 500 | 500 | 500 | 0 | −500 | −500 | −500 |
| | 50 | 0 | 0 | 500 | 1000 | 1000 | 1000 | 500 | 0 | −500 | −500 |
| | 60 | 0 | 0 | 500 | 1000 | 1000 | 1000 | 500 | 500 | 0 | −500 |
| | 70 | 0 | 0 | 500 | 1000 | 1000 | 1000 | 1000 | 500 | 500 | 0 |
| | 80 | 0 | 0 | 500 | 1000 | 1000 | 1000 | 1000 | 500 | 500 | 0 |
| | 90 | 0 | 0 | 500 | 1000 | 1000 | 1000 | 1000 | 500 | 500 | 0 |
| | 100 | 0 | 0 | 500 | 1000 | 1500 | 1500 | 1000 | 500 | 500 | 0 |

Control unit 4 accesses memory 8 and the calibration map for each predetermined time interval Δt to read the number of changes of simulated revolutions in neutral (RpmN(t−1)) and calculate the value of simulated engine revolutions in neutral (RpmN(t)) at the current time t. Note that in the specific example above, the calibration map includes discrete input values for the throttle signal and discrete input values for the number of simulated engine revolutions in neutral (RpmN(t−1)) at the preceding time t−1.

Looking at the table, once the system is started up and the simulated revolutions have been raised to 1500, if the accelerator is not used, there are no variations in the simulated revolutions. Zeroes at simulated revolutions below 1500 revolutions actually simulate idle speed maintenance. If the accelerator 103 (always in neutral gear) is used to increase the clutch signal percentage, an increase in the number of revolutions equal to 500 is generated for each 10% increase in the clutch signal percentage, thus increasing the number of simulated engine revolutions; on the other hand, the reduction in the throttle opening leads to a decrease in the number of simulated revolutions.

Also in the case of acceleration signal 5, the same is an analog signal (e.g. a voltage between 0 and 5 Volts) which is transformed by a transfer curve 37 into a percentage acceleration value (AccPercentage). See FIG. 7.

The calibration map uses the throttle percentage and the same value as the values of simulated engine revolutions in neutral (RpmN) output from the map, looping it and varying the number of simulated rpm.

Control unit 4 uses this map to intersect, according to the engine revolutions values simulated in neutral (RpmN)—looking on the axis of the abscissae—and the acceleration signal in percentage (AccPercentage)—looking on the axis of the ordinates—and use the value it finds to add it to the same value of simulated engine revolutions in neutral (RpmN). The values in the table are expressed in Rpm/s and the control unit 4, at intervals of 0.125 ms (calibratable), adds the value found to the value of previous simulated engine revolutions in neutral (RpmN(t-1), creating precisely a recursive interaction. Positive values on the map handle accelerations, negative values decelerations, and 0 indicates stationary moments. Control unit 4 can use interpolation to find any values not present on the map and cover all engine points. Obviously it is also possible a very fine calibration of the map that allows you to faithfully emulate the behavior of the engine, because, increasing the size of the map very precise calibrations can be entered that allow replicating engines with carburetor power wherein the return to idle is very slow at low revolutions and fast at high rpm, while on injection engines is more linear. Always using this map the revolutions limiter that operates at too high rpm can be replicated; calibrating values that manage a continuous variation of simulated engine revolutions in neutral (RpmN) with 100% throttle, creating a minimum increase/decrease in loop every 0.125 ms of simulated engine revolutions in neutral (RpmN) can be replicated, too.

Also with regard to the RpmNorm_map represented above, a function can be implemented (and preferably used) that momentarily freezes the operation of the map when the driver releases the clutch with an engaged gear, so that when you press/use the clutch again there is not too much gap between the simulated engine revolutions in neutral (RpmN) and the value of simulated engine revolutions (RpmFinal). In practice the map stops working momentarily, and when it enters the conditions to resume working, it starts calculating again taking the last value of the simulated engine rpm value (RpmFinal). From the point of view of the flowchart:

If the value of the clutch signal in percentage is zero, i.e. ClutchPercentage=0, the vehicle speed, i.e. VehicleSpeed>of the calibratable value ClutchEngagedSpeed_c and the simulated gear entered is not neutral, i.e. GearInsered>0, the output value of the engine revolutions simulated in neutral (RpmN) must be equal to the simulated engine revolutions value (RpmFinal). As soon as one of the three above mentioned conditions decays, the map RpmNorm_map returns to calculate as previously indicated starting from the last value read by simulated engine revolutions (RpmFinal).

In this step, the ISE sound emulation module uses the simulated engine revolutions in neutral and the percentage acceleration (AccPercentage) signals to dynamically execute the audio tracks in its memory that reproduce the sound of the simulated engine. In particular, several audio tracks are added together to arrive at the most realistic simulation possible.

During the cut-off step, control unit 4 identifies this mode by seeing a decrease in the simulated revolutions and adds the sound of detonations (which generally occur in the simulated engine exhaust) to the pure sound of the engine. The v ISE also dynamically manages the audio cuts and channel selection according to the audio track to be replicated, creating sound directionality. For example, the sound of cut-off detonations will be reproduced by the speakers on the back of the bike, while those of the engine mechanics by the speakers in the middle.

The ISE sound emulation module uses the same input values to generate n frequency and intensity signals to be sent to the bass-shakers to create vibrations.

From the user's point of view, by acting on the throttle control, the user will perceive different system noise emissions as the gas control changes. The user will perceive sensations equivalent to those generated by a combustion engine, hearing the noise of the revolutions that rise and fall more or less quickly depending on how much you act on the accelerator and will hear the same sounds of the endothermic engine, from the sound of mechanical components in motion, to that created by the bursts in acceleration, to the detonations of unburned fuel that detonates in the exhaust when the engine is decelerating. Under the same engine conditions, the user would not perceive any difference between the sounds reproduced by the emulator and the sounds emitted by the real motion to be emulated. Vibrations are also dynamically reproduced using bass-shakers. The vibrations vary in frequency and intensity according to the engine points, simulating both mechanical and sound vibrations present in the exhaust.

Stall and Departure

If the driver, during a starting attempt, releases clutch 101 too abruptly and/or does not act correctly on throttle control 103, emulator 1 will enter a stall step with consequent shutdown of the simulated engine and the user will perceive the typical noise and vibrations (this of course in expert driver simulation mode, as previously explained). In order to restart the vehicle, the user must restore the correct gear (first gear), following the procedures described above to restart the vehicle.

In general, control unit 4 calculates, by means of the emulation module, the simulated engine revolutions value (RpmFinal) at the current time t as a function of the acceleration signal 5, the number of revolutions (RpmExt) of the electric motor 104, the simulated gear inserted value (GearInserted), and the clutch signal 2*a*, in particular the clutch signal in percentage (ClutchPercentage).

Figure 8:
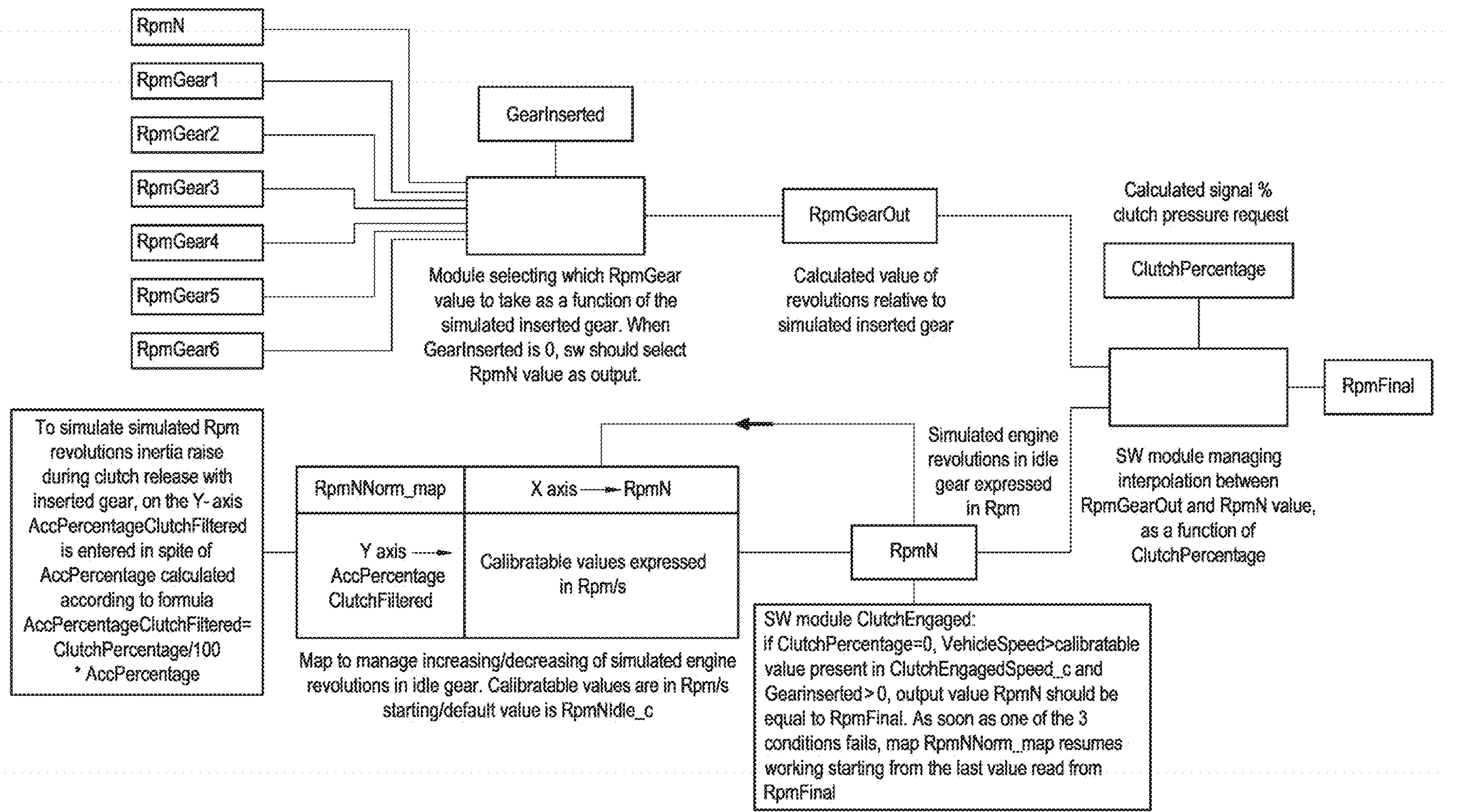
FIG. 8 shows the flow chart for calculating the value of simulated engine revolutions.

FIG. 8 shows the calculation flow chart of the simulated engine revolutions value (RpmFinal).

In an initial substep, the value of the simulated number of revolutions relative to the simulated gear inserted (RpmGearOut) is calculated; the calculation is carried out by control unit 4 as a function of the number of revolutions (RpmExt) of the electric motor 104 and the value of the simulated gear inserted (GearInserted). In particular, the value of the simulated number of revolutions relative to the simulated gear inserted (RpmGearOut) is calculated by multiplying the number of revolutions (RpmExt) of the electric motor (104) by a gear coefficient (RpmGearlNorm_c; RpmGear2Norm_c; RpmGear3Norm_c; . . . RpmGearNorm_c) which is a function of the simulated gear inserted value. From this an array with the values of the number of revolutions for each simulated gear (RpmGear1, RpmGear2, RpmGear3, . . . , RpmGearN) is obtained.

You can alternatively calculate only the relevant value starting from the simulated gearvalue inserted, or prepare a table containing all the values calculated for each simulated gear, possibly including the idle (as shown in FIG. 8) and then a suitable calculation module will receive as input all these values and the simulated gear value that will indicate which of the calculated values to take into account for subsequent processing. If the simulated applied gear is idle, then the value of the simulated number of revolutions relative to the simulated gear inserted (RpmGearOut) will coincide with the value of simulated engine revolutions in neutral (RpmN).

Always as shown in FIG. 8, the step of calculating the value of simulated engine revolutions (RpmFinal) at the current time t includes a further substep of determining the value of simulated engine revolutions (RpmFinal) as a function of the value of the number of simulated engine revolutions relative to the simulated gear inserted (RpmGearOut), of the value of simulated engine revolutions in neutral (RpmN), and of the clutch signal 2*a*, in particular the clutch signal in percentage (ClutchPercentage). In more detail, the value of simulated engine revolutions (RpmFinal) is calculated by interpolating, preferably linearly, the value of the simulated number of revolutions relative to the simulated gear inserted (RpmGearOut) and the value of simulated engine revolutions in neutral (RpmN) as a function of the clutch signal 2*a*. With the released clutch signal, the simulated engine revolutions value (RpmFinal) is equal to the value of the simulated number of revolutions relative to the simulated gear inserted (RpmGearOut); with the clutch signal fully activated, the simulated engine revolutions value (RpmFinal) is equal to the value of the simulated engine revolutions in neutral (RpmN); with clutch signal 2*a* at 50%, the simulated engine revolutions value (RpmFinal) is equal to half of the sum of the simulated engine revolutions value for the simulated gear inserted (RpmGearOut) and the simulated engine revolutions in neutral (RpmN(t)). The last block of the simulated speed management module actually interpolates the calculated values RpmGearOut and RpmN according to the value of the clutch signal in percentage (ClutchPercentage). The following table shows a possible example of interpolation and its output values.

| RpmGearOut | RpmN | ClutchPercentage | RpmFinal |
|---|---|---|---|
| 6500 | 1500 | 100% | 1500 |
| 6500 | 1500 | 0% | 6500 |
| 6500 | 1500 | 10% | 2000 |
| 6500 | 1500 | 25% | 2750 |
| 6500 | 1500 | 60% | 4500 |

The simulated engine revolutions value (RpmFinal) is the calculated signal of simulated revolutions that will be used by the revolutions counter 23 of the display 22 and for the reproduction of the engine sound.

The Requested Simulated Torque/Power

Memory 8 also includes a prefixed number of simulated torque maps and/or simulated power maps (one for each simulated gear) in which, following an input function of the acceleration signal 5, or of the acceleration signal in percentage (AccPercentage), and function of the simulated engine revolutions value (RpmFinal), a torque value relative to the simulated gear inserted (TorqueGearOut) and/or power value relative to the simulated gear inserted is uniquely associated. Indeed, control unit 4 accesses memory 8 and, by selecting the simulated torque map and/or the simulated power map according to the GearInserted value, reads or receives the torque value for the simulated gear inserted (TorqueGearOut) and/or the power value for the simulated gear inserted. However, it is understood that the same reasoning and algorithms for calculating and controlling the electric propulsion engine can be adopted using power values instead of torque values.

The memory contains a number of maps (or tables) based on the number of gears to be simulated.

In a first alternative, these maps/tables have on the axis of the abscissae the value of the simulated number of revolutions relative to the simulated gear inserted (RpmGearOut) and on the axis of the ordinate the acceleration signal in percentage (AccPercentage), i.e. the percentage of throttle activation. The values of each box on the map, expressed for example in Nm, indicate the torque output of the engine simulated at that specific engine point. If necessary, using the interpolations will cover all possible motor points.

Figure 9:
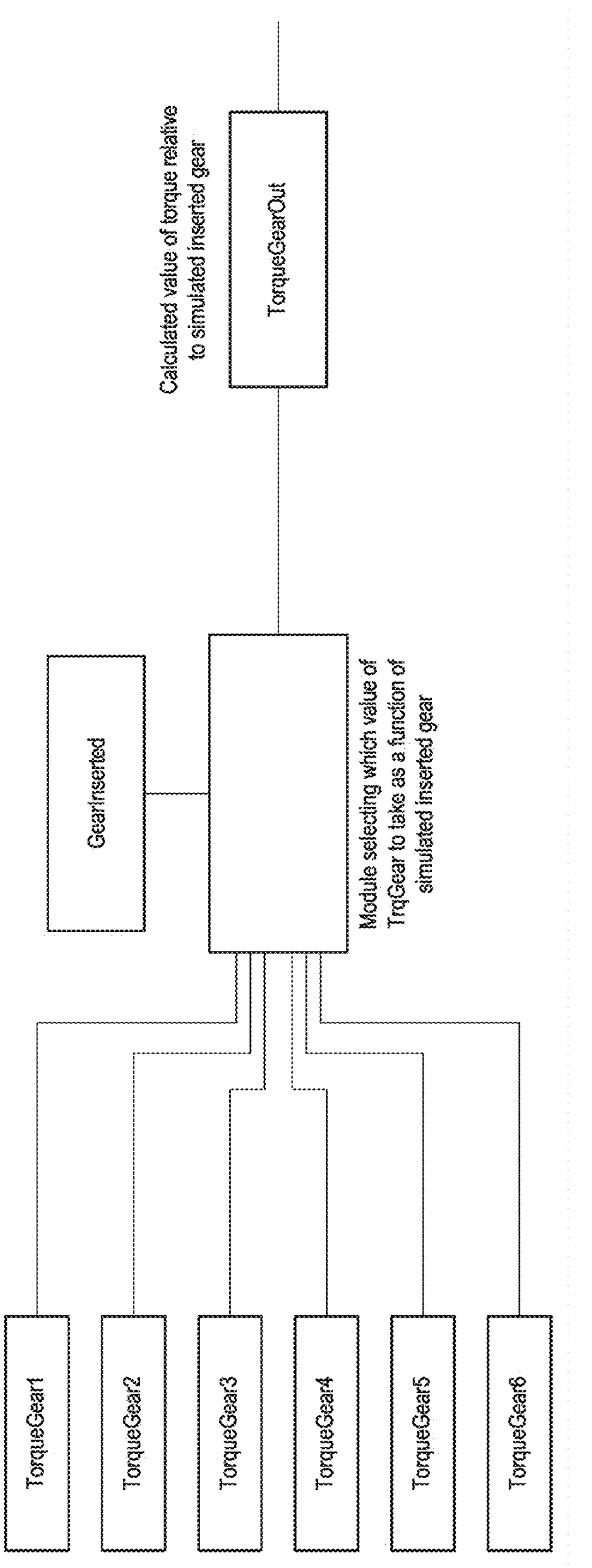
FIG. 9 is a flow chart that illustrates the calculation module of the simulated torque relative to the simulated gear inserted.

Depending on the GearInsered value, the torque value for the TorqueGearOut value is calculated. The calculated output value indicates the torque requested at that moment by the user with the simulated gear that has been inserted (see the flow chart in FIG. 9).

If the value of the simulated gear inserted is equal to zero, i.e. neutral gear, the torque value relative to the simulated gear inserted (TorqueGearOut) is consequently equal to zero.

Therefore, in the first alternative, in the torque request maps (TorqueGear1 . . . 6_map), the values RpmGear1 . . . 6 (taken from the simulated engine speed module) were used, calculated by multiplying RpmExt (number of revolutions of the electric motor) by a coefficient relative to the gear ratio.

In order to have a totally realistic feedback, however, a slightly different methodology can be used in which new calculated values of the number of revolutions in the respective simulated N gear for the torque management module are created, also called RpmTorqueGear1 . . . 6, where the coefficient relative to the gear ratio is no longer multiplied by the number of revolutions of the electric motor (RpmExt) but, vice versa, is multiplied by the number of simulated engine revolutions (RpmFinal). These values are then used in the TorqueGear1 . . . 6_map maps, replacing the RpmGear1 . . . 6 values.

RpmFinal × RpmGear1Norm_c = RpmTorqueGear1 Simulated first gear speed for torque management module RpmFinal × RpmGear2Norm_c = RpmTorqueGear2 Simulated second gear speed for torque management module RpmFinal × RpmGear3Norm_c = RpmTorqueGear3 Simulated third gear speed for torque management module RpmFinal × RpmGear4Norm_c = RpmTorqueGear4 Simulated fourth gear speed for torque management module RpmFinal × RpmGear5Norm_c = RpmTorqueGear5 Simulated fifth gear speed for torque management module RpmFinal × RpmGear6Norm_c = RpmTorqueGear6 Simulated sixth gear speed for torque management module Calibratable values In this second (preferred) alternative, it is necessary to create these new calculated values and it is not possible to simply replace the rpm of the electric motor (RpmExt) with the number of simulated engine rpm (RpmFinal) in the calculation of RpmGear1 . . . 6, because in the simulated rpm module, RpmGear1 . . . 6 work correctly with the number of simulated engine rpm (RpmFinal) for other functions.

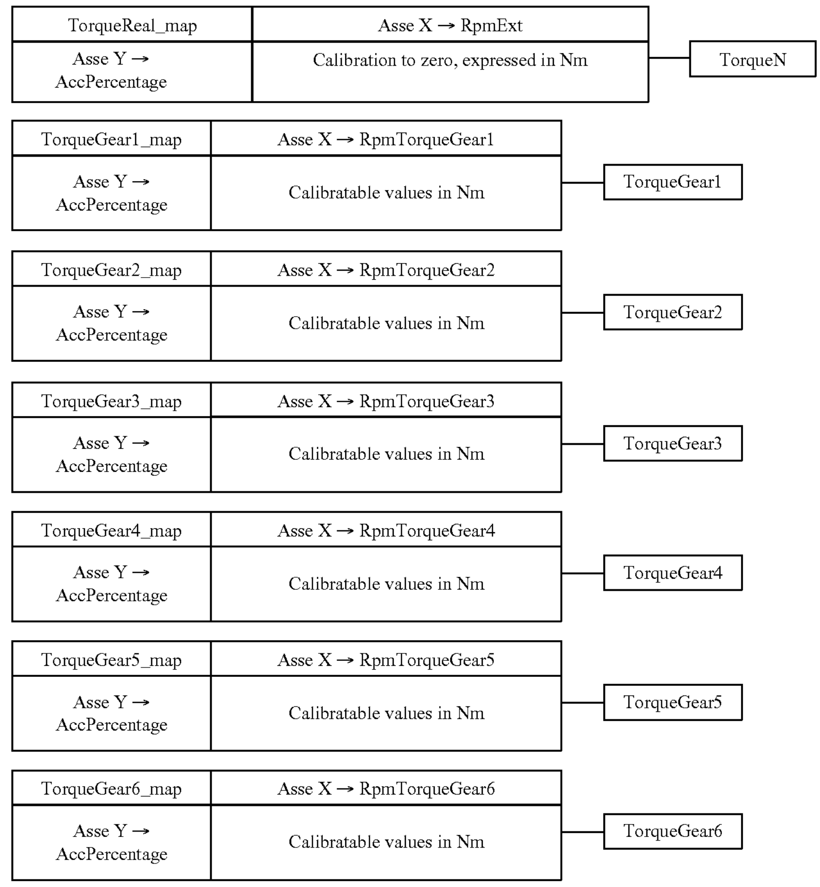

At this point and in the absence of simulated torque corrections described in the following paragraph, control unit 4 can determine the requested simulated torque value (TorqueFinal). The calculation is a function of the torque value relative to the simulated gear inserted (TorqueGearOut) of the simulated endothermic combustion vehicle and of the clutch signal 2*a*, in particular the clutch signal in percentage (ClutchPercentage). The requested simulated torque value (TorqueFinal) is calculated by interpolating, preferably linearly, between a zero value and the torque value relative to the simulated gear inserted (TorqueGearOut) as a function of the clutch signal 2*a*. With the released clutch signal, the requested simulated torque value (TorqueFinal) coincides with the torque value relative to the simulated gear inserted (TorqueGearOut); with the clutch signal fully activated, the requested simulated torque value (TorqueFinal) is zero. In an electric propulsion vehicle configured with emulator 1 with direct control on the motorcycle/vehicle controller/controller (and not in accelerator bypass), the requested simulated torque value (TorqueFinal) is the value sent to the controller for the torque request.

Simulated Required Torque Corrections (Optional)

Figure 10:
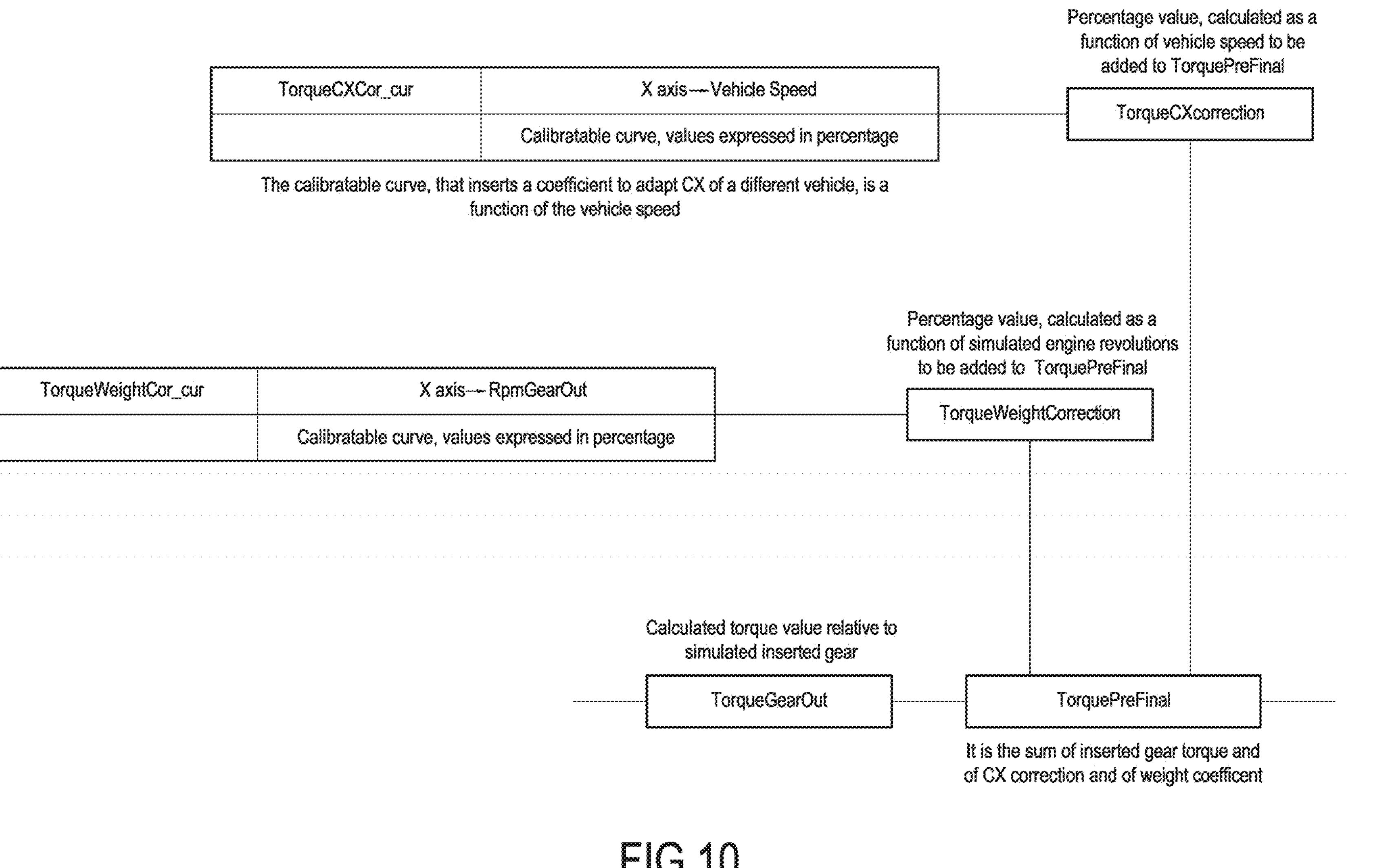
FIG. 10 is a flow chart that illustrates the calculation of a simulated pre-final torque value.

In the next calculation block (see FIG. 10), emulator 1 uses one or two corrections (ex percentage corrections) of the simulated required torque to increase the realism of the simulation. Control unit 4 can correct the torque value of the simulated gear inserted (TorqueGearOut) according to at least one of, and in particular both, an aerodynamic resistance parameter of the simulated endothermic combustion vehicle and a weight parameter of the simulated endothermic combustion vehicle. An aerodynamic correction value (TorqueCXcorrection) is calculated for the torque value relative to the simulated gear inserted (TorqueGearOut); the aerodynamic correction value (TorqueCXcorrection) is a function of the speed of the electric propulsion vehicle 100 and at least one parameter that takes into account the different aerodynamic coefficients of the electric propulsion vehicle 100 and the simulated endothermic combustion vehicle.

Control unit 4 determines the pre-final torque request value (TorquePreFinal) of the simulated endothermic combustion vehicle by adding the torque value relative to the simulated gear inserted (TorqueGearOut) to the aerodynamic correction value (TorqueCXcorrection). The calibratable curve (TorqueCXCor_cur)—see FIG. 10—contains the correction values that must be applied to the torque requirement in order to simulate motorcycles that have a different aerodynamic coefficient than the vehicle/electric motorbike being used. Depending on the vehicle speed, control unit 4 will take the percentage value present in the curve and create the calculated value of aerodynamic correction (TorqueCXcorrection). If you want to emulate a road bike using a Naked electric bike, you will need to calibrate the curve (TorqueCXCor_cur) with higher and higher values as the speed increases. For example, if you emulate a Naked electric motorcycle on a street electric motorcycle, the calibratable values will be negative.

Control unit 4 is also (or alternatively) configured to calculate a weight correction value (TorqueWeightCorrection) for the torque value relative to the simulated gear inserted (TorqueGearOut); the weight correction value (TorqueWeightCorrection) is a function of the value of the number of simulated revolutions relative to the simulated gear inserted (RpmGearOut) and of at least one coefficient that takes into account the different weights of the electric propulsion vehicle 100 and the simulated endothermic combustion vehicle. Control unit 4 calculates the pre-final torque request value (TorquePreFinal) of the simulated endothermic combustion vehicle by adding the torque value relative to the simulated gear input (TorqueGearOut) to the weight correction value (TorqueWeightCorrection) and/or to the aerodynamic correction value (TorqueCXcorrection). Also in this case, the calibratable curve (TorqueWeightCor_cur) contains the correction values that must be applied to the torque request in order to simulate motorcycles that have a different weight compared to the electrically driven vehicle/motorcycle that is being used. Depending on the value of the simulated number of revolutions of the simulated gear inserted (RpmGearOut), control unit 4 will take the percentage value present in the curve and create the calculated value of weight correction (TorqueWeightCorrection). If you want to emulate a bike that weighs 140 kg using an electric bike that weighs 200 kg, you must calibrate the curve (TorqueWeightCor_cur) with values higher and higher as the number of simulated revolutions of the simulated gear inserted. If you emulate a motorcycle weighing 200 kg using an electric motorcycle weighing 180 kg, the calibratable values will be negative.

The aerodynamic correction value (TorqueCXcorrection) and the calculated weight correction value (TorqueWeightCorrection) are added to the torque value relative to the simulated gear input (TorqueGearOut) generating the calculated pre-final torque request value (TorquePreFinal).

At this point, control unit 4 can determine the requested simulated torque value (TorqueFinal). The calculation is a function of the pre-final torque request value (TorquePreFinal) of the vehicle simulated by endothermic combustion and of the clutch signal 2*a*, in particular the clutch signal in percentage (ClutchPercentage). The requested simulated torque value (TorqueFinal) is calculated by interpolating, preferably linearly, between a zero value and the pre-final torque required value (TorquePreFinal) as a function of the clutch signal 2*a*. With the released clutch signal, the requested simulated torque value (TorqueFinal) coincides with the pre-final torque request value (TorquePreFinal); with the clutch signal fully activated, the requested simulated torque value (TorqueFinal) is zero. The following table shows examples of such interpolation:

| TorquePreFinal | TorqueZero | ClutchPercentage | TorqueFinal |
|---|---|---|---|
| 40 | 0 | 100% | 0 |
| 40 | 0 | 0% | 40 |
| 40 | 0 | 10% | 36 |
| 40 | 0 | 25% | 30 |
| 40 | 0 | 60% | 16 |

In an electric propulsion vehicle configured with emulator 1 with direct control on the motorcycle/vehicle controller/controller (and not in accelerator bypass), the requested simulated torque value (TorqueFinal) is the value sent to the controller for the torque request.

The Value of the Acceleration Command

Memory 8 contains a real torque map in which, following a function input of the engine revolutions value (RpmExt) of the electric motor 104 and the requested simulated torque value (TorqueFinal), an accelerator control value is associated, in particular a percentage command (AccPercentageOut). Control unit 4 accesses memory 8 and selects the real torque map to receive the acceleration command value (AccPercentageOut) and determine an accelerator control signal (OutputThrottle) to be sent to the electric propulsion vehicle control unit 100 to control it. As mentioned above, control unit 4 receives the acceleration command value (AccPercentageOut) as a percentage value and converts it into the analogue acceleration control signal (OutputThrottle) (e.g. a corresponding voltage between 0 and 5 Volts) to be sent to the electric propulsion vehicle control unit 100 to control it.

An example of a real torque map is shown below:

| | | RpmExt | | | | | | | | | | | | | |
|---|---|---|---|---|---|---|---|---|---|---|---|---|---|---|---|
| TorqueReal_map | | 0 | 500 | 1000 | 1500 | 2000 | 2500 | 3000 | 3500 | 4000 | 4500 | 5000 | 5500 | 6000 | 6500 |
| AccPercentage | 0% | 0 | 0 | 0 | 0 | 0 | 0 | 0 | 0 | 0 | 0 | 0 | 0 | 0 | 0 |
| | 10% | 10 | 10 | 10 | 10 | 10 | 10 | 10 | 10 | 0 | 0 | 0 | 0 | 0 | 0 |
| | 20% | 20 | 20 | 20 | 20 | 20 | 20 | 20 | 20 | 0 | 0 | 0 | 0 | 0 | 0 |
| | 30% | 30 | 30 | 30 | 30 | 30 | 30 | 30 | 30 | 20 | 0 | 0 | 0 | 0 | 0 |
| | 40% | 40 | 40 | 40 | 40 | 40 | 40 | 40 | 40 | 20 | 0 | 0 | 0 | 0 | 0 |
| | 50% | 60 | 60 | 60 | 60 | 60 | 60 | 60 | 60 | 50 | 0 | 0 | 0 | 0 | 0 |
| | 60% | 90 | 90 | 90 | 90 | 90 | 90 | 90 | 90 | 60 | 30 | 0 | 0 | 0 | 0 |
| | 70% | 100 | 100 | 100 | 100 | 100 | 100 | 100 | 100 | 80 | 40 | 0 | 0 | 0 | 0 |
| | 80% | 130 | 130 | 130 | 130 | 130 | 130 | 130 | 130 | 110 | 50 | 20 | 0 | 0 | 0 |
| | 90% | 140 | 140 | 140 | 140 | 140 | 140 | 140 | 140 | 120 | 80 | 50 | 0 | 0 | 0 |
| | 100% | 155 | 155 | 155 | 155 | 155 | 155 | 155 | 155 | 140 | 130 | 120 | 90 | 40 | 0 |

In other words, in the last block that manages the torque request, the requested simulated torque value (TorqueFinal) is used in the map (for example the one above) to calculate what percentage throttle control unit 4 must implement to get the required torque feedback. Using the map, control unit 4 starts from the RpmExt value—abscissa axis—and searches for the requested simulated torque value (TorqueFinal) among the values written vertically at the RpmExt value selected on the map in order to find the value on the abscissa axis, which will be the output value. If there are more than one equal value on the axis of the ordinates, control unit 4 moves the values backwards until it finds the lowest value compared to the one sought; if the sought value does not exist, control unit 4 moves the column down until it finds the mathematical value previous to the sought value. The calculated accelerator command value (AccPercentageOut) is generated at the output.

Figure 11:
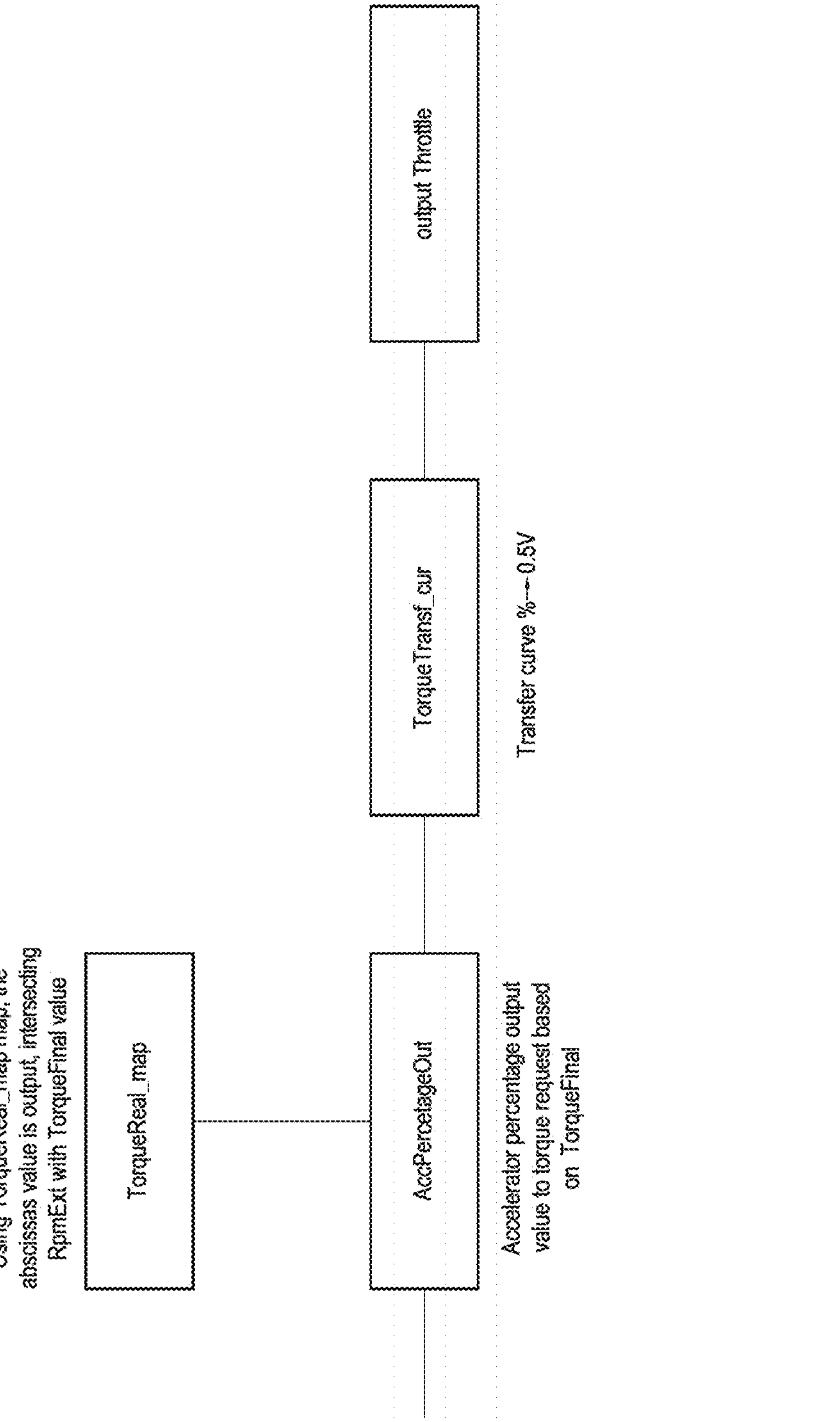
FIG. 11 is a flow chart that illustrates the calculation module of the accelerator control signal.

Control unit 4 uses the transfer curve to change from the percentage value to the equivalent accelerator actuation voltage (see FIG. 11). The calculated signal is the accelerator control signal (OutputThrottle), i.e. the analog output value that the emulator will use to communicate the torque request to the controller/control unit 105 of the electric motor/electric vehicle. In this case, emulator 1 is bypassed over throttle 103 and sends the voltage signal, i.e. the accelerator control signal (OutputThrottle) to the controller using the original motorcycle/vehicle wiring.

Finally, it should be noted that the real torque map could be pre-stored and static, i.e. with fixed values, or the control unit 4 could receive a real torque signal from the electric vehicle 100, thus being able to auto-fill the real torque map with the values gradually received from the control unit 105.

Stall

For stall simulation there is a calibratable counter (EngineStallTime_c) that starts counting when the simulated engine revolutions value (RpmFinal) is lower than the minimum value of the simulated engine (RpmNldle). Once the calibrated time threshold has been reached, the simulated engine shuts down, i.e. the simulated engine revolutions value returns to zero and the sampled sound of the engine stall is emitted, stopping the reproduction of all the other sounds. In addition to the stall sound, the irregular vibration of the engine shutdown is reproduced and no more vibrations are produced until the user restarts the engine. Emulator 1 returns to the starting condition and all values return to the default value, except for the gear inserted, which remains the last gear inserted by the user. To start the simulated engine again, the user must, with vehicle speed equal to 0, put the gear to neutral or press the clutch 100%.

The Minimum

The simulated torque maps have a calibration that identifies the torque delivered at each engine point. In the area of the map that identifies the torque output with throttle signal at 0, the map is all calibrated to zero or with negative values, except in the control part of the minimum. Having values above zero in the idle speed zone (e.g. 800 and 1500 rpm), control unit 4 can simulate dragging and delivering power even when the throttle demand is 0 but you are at very low rpm, just like on a manual transmission internal combustion engine. In the zone between 1000 and 1500 revolutions (subregime) the maps are calibrated with values that increase and decrease in succession, to create the non-linear delivery effect typical of the subregime.

The Motor Brake (Optional)

The negative values in the simulated torque maps can be used for the emulated reproduction of the engine brake. When there is a negative value in the requested simulated torque value (TorqueFinal), control unit 4 sends this calculated value to a module that manages the regenerative braking request.

Memory 8 contains a map of the brake/engine inertia parameters of the simulated endothermic combustion vehicle associated with a corresponding positive or negative change in the simulated engine revolutions value (RpmFinal). Control unit 4 calculates the variation (DownShiftAccelerationValue) of the simulated engine revolutions value (RpmFinal) and obtains a brake torque value/engine start value (DownShiftEngineBrake); adding the brake torque value/engine start value (DownShiftEngineBrake) to the requested simulated torque value (TorqueFinal), control unit 4 corrects the requested simulated torque value and obtains a motor brake or motor inertia effect. A corrected simulated torque value (TorqueFinal) below zero controls the control unit 105 to obtain regenerative braking. Negative values range from −1 to −100, wherein −1 equals minimum regenerative braking, and −100 is equal to wheel lock. The regenerative brake is only applied if the values are below 0. For example, simulating an Aprilia RS 250, the regenerative brake will have a maximum value of −25 at high simulated revolutions (12000), while this value can reach high calibrations by emulating large displacement twin-cylinder bikes. When you enter the condition in which the throttle request is 0, but the simulated engine revolutions have a positive acceleration, it means that a gear down shift is ongoing.

The output value from the curve (DownShiftEngineBrake_cur) will be added to the negative output value from the requested simulated torque value (TorqueFinal) to obtain a totally realistic motor brake/engine inertia sensation. Control unit 4 cuts sums below −100 to this latter value.

The sound simulation routine manages the audio part as in the "Stall and start" section. The dynamic reproduction of the sampled audio tracks takes place according to the calculated signals. The signal of the simulated engine revolutions value (RpmFinal), in addition to the exhaust noise, is used by the sound simulation routine also for the reproduction of mechanical sounds, which are added to the other tracks. The over-speeds are managed as a single sampled track, as well as the sound of gear shifting during gear shifting and unburnt fuel detonations in the racing exhaust during the cut-off, which are added/replaced to those being reproduced. The reproduction of the detonations has a very precise logic. Specifically because these detonations in the real motorbike to be simulated occur only when the exhaust is at temperature, the emulator 1 starts to reproduce them only after a calibratable time has passed.

Control unit 4 also supports the calculation of the simulated motor temperature modeling or the use of the battery/engine temperature sensor of the electric motor received from the controller via CAN.

The invention claimed is:

1. Emulator for an electric propulsion vehicle comprising a processor configured to:

determine an acceleration signal relating to a position of an accelerator of the electric propulsion vehicle;

determine a value relating to engine revolutions of an electric motor of the electric propulsion vehicle based on a vehicle speed signal of the electric propulsion vehicle and/or based on an engine revolution signal relating to the engine revolutions of the electric motor of the electric propulsion vehicle;

determine a simulated gear inserted value of a simulated endothermic combustion vehicle;

calculate a value of simulated engine revolutions at a current time depending on at least one of the acceleration signal, the value relating to engine revolutions of the electric motor and the simulated gear inserted value; and calculate at least one of:

a simulated torque value as a function of the simulated engine revolutions value and of the acceleration signal; and an accelerator control signal as a function of the simulated torque value; and control the electric motor of the electric propulsion vehicle based on the simulated torque value or the accelerator control signal, wherein the emulator further comprises a memory operatively connected to the processor and comprising a motor brake/inertia parameter map of the simulated vehicle, wherein an engine/brake torque value is associated with a respective variation of the value of simulated engine revolutions, and wherein the processor is further configured to:

calculate a variation of the simulated engine revolutions and obtain an engine brake/inertia torque value, and correct the simulated torque value at a current time based on the engine brake/inertia torque value and the simulated torque value at the preceding time to obtain regenerative braking when the simulated torque value is less than zero.

2. The emulator according to claim 1, further comprising a memory operatively connected to the processor and comprising a selection list of a plurality of vehicles to be simulated, the processor having a vehicle selection form to allow a user to select one of the vehicles on the selection list, each vehicle on the selection list being associated with a corresponding vehicle-specific data package, wherein the corresponding vehicle-specific data package is based on technical features of the selected vehicle.

3. The emulator according to claim 1, wherein the processor is configured to iteratively calculate a value of simulated engine revolutions at the current time depending on the acceleration signal and the value of simulated engine revolutions in neutral at a preceding time.

4. The emulator according to claim 1, further comprising a clutch sensor configured to emit a clutch signal relative to a position of a clutch of the electric propulsion vehicle, the processor being configured to further receive the clutch signal, wherein the clutch signal is function of a stroke of the clutch.

5. The emulator according to claim 1, further comprising a gear sensor configured to emit a gear signal relative to the position of a gear shift selector of the electric propulsion vehicle, the processor being configured to further receive the gear signal, wherein the gear signal comprises an upper position signal and a lower position signal, the processor being configured to determine the simulated gear inserted value of the simulated endothermic combustion vehicle, between a minimum value of zero and a maximum value, increasing or decreasing the simulated gear inserted value depending on receiving the upper position signal or the lower position signal, the processor receiving the upper position signal thereby increasing the simulated gear inserted value by one unit and receiving the lower position signal thereby decreasing the simulated gear inserted value by one unit.

6. The emulator according to claim 1, wherein the processor is further configured to calculate a simulated torque value relative to the simulated gear inserted and/or power value relative to the simulated gear inserted based on the acceleration signal and the simulated engine revolutions.

7. The emulator according to claim 1, wherein the processor is further configured to calculate an accelerator control value based on the value relative to the engine revolutions of the electric motor and the simulated torque value to be sent to the controller of the electric propulsion vehicle to control the electric propulsion vehicle.

8. The emulator according to claim 1, wherein the processor is further configured to control a vibrator of the electric propulsion vehicle to vary a frequency and/or an intensity of vibrations generated by the vibrator based on at least one of the value of simulated engine revolutions, the acceleration signal, the simulated gear inserted value and the simulated torque value.

9. The emulator according to claim 1, wherein the processor is further configured to trigger a reproduction of a sound that varies a function of at least one of the simulated engine revolutions value, the acceleration signal, the simulated gear inserted value and the simulated torque value; and wherein the processor is further configured to trigger the reproduction of the sound each time the simulated gear inserted value changes.

10. The emulator according to claim 1, wherein the processor is further configured to trigger the reproduction of a sound of the electric propulsion vehicle based on the acceleration signal and the simulated engine revolutions, wherein the processor is configured to vary a volume of sound emission according to the acceleration signal.

11. The emulator according to claim 1, wherein the processor is further configured to trigger the reproduction of a sound simulating the performance of an electric propulsion vehicle, by playing a plurality of pre-stored audio tracks.

12. The emulator according to claim 1, wherein the processor is further configured to reproduce a rattling sound under sub-regime conditions of the simulated endothermic combustion vehicle.

13. The emulator according to claim 1, wherein the processor is configured to calculate iteratively the value of simulated engine revolutions at the current time depending at least on the acceleration signal and a value of simulated engine revolutions at the preceding time, wherein calculating iteratively the value of the simulated engine revolutions at the current time includes determining a number of variation, positive or negative, of the simulated engine revolutions to be added to the value of the simulated engine revolutions at the preceding time.

14. The emulator according to claim 1, wherein the processor is configured to calculate values of the number of revolutions in a respective simulated gear based on the number of simulated engine revolutions and a coefficient relative to the gear ratio.

15. The emulator according to claim 1, wherein the processor is further configured to calculate a simulated torque value depending to the simulated gear inserted and/or power value depending to the simulated gear inserted based on the acceleration signal and the simulated engine revolutions, such that a variation of the simulated gear inserted results in a variation of the torque and/or power value.

16. Emulator for an electric propulsion vehicle comprising a processor programmed to:

determine a value relating to engine revolutions of an electric motor of the electric propulsion vehicle based on a vehicle speed signal of the electric propulsion vehicle and/or based on an engine revolution signal relating to the engine revolutions of the electric motor of the electric propulsion vehicle;

determine a simulated gear inserted value of a simulated endothermic combustion vehicle;

determine a value of simulated engine revolutions at a current time based on the number of engine revolutions of the electric motor and the simulated gear inserted value; and control a vibrator to vary a frequency and/or an intensity of vibrations generated by the vibrator, based on the simulated engine revolutions value and the simulated gear inserted value.

17. The emulator according to claim 16, wherein the vibrator is configured to reproduce a gear shifting vibration at each variation of the simulated gear inserted value.

18. The emulator according to claim 16, wherein the processor is further configured to:

trigger the reproduction of a sound simulating the performance of the electric propulsion vehicle; and control the vibrator based on the sound simulating the performance of the electric propulsion vehicle.

* * * * *